US006997803B2

(12) United States Patent
LeMay et al.

(10) Patent No.: US 6,997,803 B2
(45) Date of Patent: Feb. 14, 2006

(54) VIRTUAL GAMING PERIPHERALS FOR A GAMING MACHINE

(75) Inventors: Steven G. LeMay, Reno, NV (US); Dwayne R. Nelson, Las Vegas, NV (US); Robert E. Breckner, Sparks, NV (US); Jamal Benbrahim, Reno, NV (US)

(73) Assignee: IGT, Reno, NV (US)

( * ) Notice: Subject to any disclaimer, the term of this patent is extended or adjusted under 35 U.S.C. 154(b) by 348 days.

(21) Appl. No.: 10/097,507

(22) Filed: Mar. 12, 2002

(65) Prior Publication Data

US 2003/0176213 A1 Sep. 18, 2003

(51) Int. Cl.
*A63F 13/00* (2006.01)

(52) U.S. Cl. ........................................................ 463/20

(58) Field of Classification Search ............ 463/17–21, 463/25, 29–30, 37, 40, 42–43
See application file for complete search history.

(56) References Cited

U.S. PATENT DOCUMENTS

| | | | | |
|---|---|---|---|---|
| 3,931,504 | A | 1/1976 | Jacoby | 235/153 |
| 4,430,728 | A | 2/1984 | Beitel et al. | 364/900 |
| 4,454,594 | A | 6/1984 | Heffron et al. | 364/900 |
| 5,643,086 | A | 7/1997 | Alcorn et al. | 463/29 |
| 5,655,961 | A | 8/1997 | Acres et al. | 463/227 |
| 5,761,647 | A | 6/1998 | Boushy | 705/10 |
| 5,851,149 | A | 12/1998 | Xidos et al. | 463/42 |
| 6,099,408 | A | 8/2000 | Schneier et al. | 463/29 |
| 6,104,815 | A | 8/2000 | Alcorn et al. | 380/251 |
| 6,106,396 | A | 8/2000 | Alcorn et al. | 463/29 |
| 6,113,495 | A | 9/2000 | Walker et al. | |
| 6,149,522 | A | 11/2000 | Alcorn et al. | 463/29 |
| 6,190,256 | B1 * | 2/2001 | Walker et al. | 463/25 |
| 6,253,374 | B1 | 6/2001 | Dresevic et al. | 717/11 |
| 6,446,257 | B1 | 9/2002 | Pradhan et al. | 717/154 |
| 6,449,687 | B1 | 9/2002 | Moriya | 711/112 |
| 6,453,319 | B1 | 9/2002 | Mattis et al. | 707/100 |
| 6,454,648 | B1 | 9/2002 | Kelly et al. | 463/16 |
| 2003/0069074 | A1 * | 4/2003 | Jackson | 463/43 |

FOREIGN PATENT DOCUMENTS

| | | | |
|---|---|---|---|
| AU | 199650576 | | 4/1997 |
| EP | 0 769 769 | | 4/1997 |
| EP | 0769769 | * | 4/1997 |
| EP | 1255234 A2 | | 6/2002 |
| WO | WO 02/073501 | | 9/2002 |

* cited by examiner

*Primary Examiner*—Kim Nguyen
(74) *Attorney, Agent, or Firm*—Beyer Weaver & Thomas LLP

(57) ABSTRACT

A disclosed gaming machine provides a plurality of virtual gaming peripherals that are each used to generate one or more gaming services. To provide a particular gaming service, each virtual gaming peripheral may comprise virtual gaming peripheral software that controls one or more gaming devices. A logic device, such as a master gaming controller on the gaming machine, may simultaneously activate a plurality of virtual gaming peripherals. Therefore, a gaming device may be shared by a plurality of active virtual gaming peripherals and additional logic may be provided to resolve conflicts that arise when two or more virtual gaming peripherals desire to control the same gaming device at the same time.

15 Claims, 11 Drawing Sheets

VIRTUAL GAMING PERIPHERALS FOR A GAMING MACHINE

BACKGROUND OF THE INVENTION

This invention relates to gaming machines such as video slot machines and video poker machines. More particularly, the present invention relates to methods and apparatus for providing game services on gaming machines.

Typically, utilizing a master gaming controller, a gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional mechanically driven reel slot machines are being replaced with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

To implement the gaming features described above on a gaming machine using computing architectures utilized in the personal computer industry, a number of requirements unique to the gaming industry must be considered. The gaming machine on the casino floor is a highly regulated device. It is licensed, monitored, taxed and serviced. Typically, within a geographic area allowing gaming, i.e. a gaming jurisdiction, a governing entity is chartered with regulating the games played in the gaming jurisdiction to insure fairness and to prevent cheating. For instance, in many gaming jurisdictions, there are stringent regulatory restrictions for gaming machines requiring a time consuming approval process of 1) new gaming hardware, 2) new gaming software and 3) any software modifications to gaming software used on gaming machines.

As an example of the regulation process, in many jurisdictions, to regulate gaming software on a gaming machine, a gaming software executable is developed and then burnt onto an EPROM. The EPROM is then submitted to various gaming jurisdictions for approval. After the gaming software is approved, a unique signature is determined for the gaming software stored on the EPROM using a method such as a CRC. Then, when a gaming machine is shipped to a local jurisdiction, the gaming software signature on the EPROM can be compared with an approved gaming software signature prior to installation of the EPROM on the gaming machine. The comparison process is used to ensure that approved gaming software has been installed on the gaming machine. After installation, an access point to the EPROM may be secured with evidence tape as a means of determining whether illegal tampering has occurred with the EPROM.

Besides regulating gaming hardware and software, a gaming jurisdiction may regulate many other aspects of gaming including where games of chance are played (e.g. casinos, stores, restaurants and other venues), who may participate in game play (e.g. enforcing age restrictions) and where regulated gaming machines may be located (e.g. particular areas of a casino). To obtain an operating license, a casino is required to adhere to the rules and regulations of the gaming jurisdiction in which it is located. Further, a licensed casino that fails to adhere to local gaming regulations may have its operating license revoked.

Security is another factor that must be considered in the gaming industry. A gaming machine can be capable of accepting, storing and dispensing large sums of money. Thus, gaming machines are often the targets of theft attempts. Gaming software and gaming hardware are designed to resist theft attempts and include many security features not present in personal computers or other gaming platforms. For example, gaming software and hardware are designed to make it extremely difficult to secretly alter the gaming software to trigger an illegal jackpot.

Gaming devices and gaming peripherals installed on a gaming machine may be classified according to whether or not they are directly involved in providing a game of chance on a gaming machine. Critical gaming devices are gaming devices used to provide a game of chance and are typically more regulated and thus, more scrutinized than gaming peripherals that are placed on a gaming machine but are not directly involved in providing the game of chance. A master gaming controller used to generate a game of chance and its associated software is an example of critical gaming device. A player tracking unit, with it's associated hardware and software, is an example of a gaming peripheral not directly involved in providing the game of chance on the gaming machine. For security purposes, access to critical gaming devices, such as a master gaming controller that is used to generate a game outcome or coin hopper used to dispense coins from a gaming machine, may be limited or unavailable for gaming peripherals not directly involved in generating a game of chance.

The gaming regulatory requirements and gaming security requirements have affected how gaming products are developed for gaming machines. When a gaming peripheral is decoupled from the critical gaming devices on the gaming machine, i.e., it can affect a game outcome in any manner, the gaming peripheral is generally subject to a less stringent regulatory approval process which lowers product development costs. Further, since the gaming peripheral can not affect the game outcome, the overall security of the gaming machine is increased. Therefore, to limit development costs from the regulatory approval process and provide greater security, the functions of gaming peripherals are often been decoupled from the functions of critical gaming devices on the gaming machine. For example, the functions of a player tracking unit, which is a gaming peripheral, are generally decoupled from the functions of the master gaming controller, which is a critical gaming device, and these gaming devices are often developed independently of one of another.

Currently, there is some desire by both game players and casino operators to expand gaming services available on a gaming machine. For example, many game players would like to continue game play at a gaming machine while performing an additional activity, such as watching a sporting event or making a wager on a sporting event. As another example, a player may wish to have food delivered to a gaming machine or communicate with another player while engaging in the game play. Typically, to obtain these gaming services, the player is required to cease game play and leave the gaming machine and casino floor which may be undesirable to the both the player and the casino.

A disadvantage of the game product design methodology described above, where gaming peripherals and critical gaming devices are developed independently with their functions decoupled, is that the flexibility in using gaming devices installed on the gaming machine for other than their designed purposes, such as a new gaming service, may be limited. For example, the gaming devices controlled by a player tracking unit, such as a display, key pad, and card reader, are not usually accessible to a master gaming controller within the gaming machine and gaming devices controlled by a master gaming controller, such as a bill validator, are not accessible to the player tracking unit. Therefore, a gaming service that requires using a combination of gaming devices that are controlled by the player tracking unit and the master gaming controller can not be provided. For instance, a master gaming controller can not use the card reader controlled by a player tracking unit to provide a gaming service and player tracking unit can not use a bill validator controlled by a master gaming controller to provide a player tracking service.

In view of the above, for providing gaming services, it would be desirable to provide methods and apparatus that allow gaming devices on gaming machines to be used in a more flexible manner

SUMMARY OF THE INVENTION

This invention addresses the needs indicated above by providing a gaming machine with a plurality of virtual gaming peripherals that are each used to provide one or more gaming services. To provide a particular gaming service, each virtual gaming peripheral may comprise virtual gaming peripheral software that controls one or more gaming devices. Examples of gaming services provides by virtual gaming peripherals may include but are not limited to a player tracking service, a vending machine purchase, a lottery ticket purchase, an ATM (Automatic Teller Machine) service, a hotel/casino service, a communication service, a registration service, a sports book service, an entertainment service, a prize redemption service and a locator service. A logic device, such as a master gaming controller on the gaming machine, may simultaneously activate a plurality of virtual gaming peripherals. Therefore, a gaming device may be shared by a plurality of active virtual gaming peripherals and additional logic may be provided to resolve conflicts that arise when two or more virtual gaming peripherals desire to control the same gaming device at the same time.

One aspect of the present invention provides a gaming machine comprising: 1) a plurality of gaming devices; 2) a master gaming controller designed to generate a game of chance played on the gaming machine by executing a plurality of game play processes where the plurality of game play processes control a first combination of the plurality gaming devices to generate the game of chance; 3) at least one virtual gaming peripheral process that provides a gaming service where each virtual gaming peripheral process controls a second combination of the plurality of gaming devices to provide the gaming service; 4) a gaming operating system that activates and deactivates gaming processes where the gaming processes comprise the game play processes and the at least one virtual gaming peripheral process; 5) at least one shared gaming device in the plurality of gaming devices that may be i) controlled by the at least one virtual gaming peripheral process and at least one game play process or ii) controlled by the at least one virtual gaming peripheral process and a second virtual gaming peripheral process; and 6) a shared gaming device manager process that determines which of the at least one virtual gaming process and the at least one other gaming process is allowed to control the at least one shared gaming device.

In particular embodiments, the at least one shared gaming device and the plurality of gaming devices may be selected from the group consisting of a light panel, a bonus wheel, a sound projection device, a card reader, a ticket reader, an input panel, a ticket reader, a touch screen, a display screen, a key pad, a camera, a finger print reader, a bill validator, a solenoid, a CD/DVD-drive, a removable media drive, a flash drive, a USB communication port, an infrared communication port, an Ethernet communication port, a printer, a bar-code reader, a biometric input device, a slot reel, a motor, a mass storage device, a communication device, a wireless communication interface, a coin hopper, a coin acceptor, a note dispenser, a smart card and a hand-held computer. The gaming service may be selected from the group consisting of a player tracking service, a vending machine purchase, a lottery ticket purchase, an ATM (Automatic Teller Machine) service, a hotel/casino service, a communication service, a registration service, a sports book service, an entertainment service, a prize redemption service and a locator service. The virtual gaming peripheral process may be selected from the group consisting of a virtual player tracking unit process, a virtual vending machine process, a virtual lottery machine process, a virtual ATM process, a virtual concierge process, a virtual video phone process, a virtual telephone process, a virtual casino kiosk process, a virtual prize redemption process, a virtual sports book process, a virtual entertainment center process and a virtual message center process. The game of chance may be selected from the group consisting of a slot game, a keno game, a poker game, a pachinko game, a video black jack game, a bingo game, a baccarat game, a roulette game, a dice game and a card game.

In other embodiments, a first virtual gaming peripheral process provides the gaming service using a first set of gaming devices and the second virtual gaming peripheral process provides the same gaming service using a second set of gaming devices. As an example, the first virtual gaming peripheral process may be a virtual player tracking unit process that uses at least a card reader, a display screen and a key pad to provide a player tracking service and second virtual gaming peripheral process may be a virtual player tracking unit process that uses at least a card reader, a display screen and a touch screen to provide the player tracking service.

In further embodiments, the virtual gaming peripheral process may be a virtual ATM process that uses at least a key pad, a card reader, a display screen and a touch screen to provide ATM services. In addition, the virtual gaming peripheral process may be a virtual lottery machine process that uses at least a touch screen, a display screen and a ticket printer to provide a lottery ticket purchase. Also, the virtual gaming peripheral process may be a virtual sports book process that uses at least a touch screen, a display screen and a ticket printer to provide a sports book wager. Furthermore, the virtual gaming peripheral process may be a virtual communication center that uses at least a touch screen and a display screen to provide communication services, messaging services and locator services.

Another aspect of the present invention provides a method of generating a gaming service and a game play for a game of chance on a gaming machine using one or more shared gaming devices. The method may be generally characterized as comprising: 1) loading a plurality of gaming processes on the gaming machine wherein at least one of the gaming processes is a virtual gaming peripheral process that is used to provide the gaming service; 2) receiving a request for the gaming service provided by the virtual gaming peripheral process wherein the virtual gaming peripheral process uses one or more shared gaming devices to provide the game service; 3) determining each of the one or more shared gaming devices used by the virtual gaming process is available; and 4) providing the gaming service using a first combination of gaming devices including the at least the one or more shared gaming devices.

In particular embodiments of the method, the at least one shared gaming device and the plurality of gaming devices may be selected from the group consisting of a light panel, a bonus wheel, a sound projection device, a card reader, a ticket reader, an input panel, a ticket reader, a touch screen, a display screen, a key pad, a camera, a finger print reader, a bill validator, a solenoid, a CD/DVD-drive, a removable media drive, a flash drive, a USB communication port, an infrared communication port, an Ethernet communication port, a printer, a bar-code reader, a biometric input device, a slot reel, a motor, a mass storage device, a communication device, a wireless communication interface, a coin hopper, a coin acceptor, a note dispenser, a smart card and a hand-held computer. The gaming service may be selected from the group consisting of a player tracking service, a vending machine purchase, a lottery ticket purchase, an ATM (Automatic Teller Machine) service, a hotel/casino service, a communication service, a registration service, a sports book service, an entertainment service, a prize redemption service and a locator service. The virtual gaming peripheral process may be selected from the group consisting of a virtual player tracking unit process, a virtual vending machine process, a virtual lottery machine process, a virtual ATM process, a virtual concierge process, a virtual video phone process, a virtual telephone process, a virtual casino kiosk process, a virtual prize redemption process, a virtual sports book process, a virtual entertainment center process and a virtual message center process. The game of chance may be selected from the group consisting of a slot game, a keno game, a poker game, a pachinko game, a video black jack game, a bingo game, a baccarat game, a roulette game, a dice game and a card game.

In particular embodiments, the method may also comprise determining one of the shared gaming devices used to provide the game service is unavailable. The shared gaming device may be unavailable because it requires maintenance or may be unavailable because it is controlled by another gaming process. The method may also comprise one or more of the following: a) prior to providing the gaming service, waiting for the unavailable shared gaming device to become available, b) displaying a message indicating the gaming service is unavailable, c) providing the gaming service using a second combination of gaming devices that does not include the unavailable shared gaming device, d) loading a virtual gaming peripheral that provides the gaming service using the second combination of gaming devices, e) assigning control of a first shared gaming device to a first gaming process, f) receiving a request from a second gaming process to use the first gaming device and preventing the second gaming process from using the first gaming device controlled by the first gaming process, g) receiving a request from a second gaming process to use the first gaming device and switching control of the first gaming device controlled by the first gaming process to the second gaming process, h) receiving a first request to use a first shared gaming device from a first gaming process; and assigning a priority to the first request, i) receiving a second request to use the first shared gaming device from a second gaming process; assigning a priority to the second request; and assigning control of the shared gaming device to the gaming process with the highest priority.

Another aspect of the present invention provides a method of allocating control of a shared gaming device in a shared gaming device manager process executed on a gaming machine with a gaming operating system that activates and deactivate gaming processes. The method may be generally characterized as comprising: 1) receiving a request from a first gaming process to use the shared gaming device to provide a gaming service; 2) assigning control of the shared gaming device to the first gaming process; and 3) preventing at least one gaming process different from the first gaming process from controlling the shared gaming device. The first gaming process may be a virtual gaming peripheral process or a game play process and the a least one gaming process different from the first gaming process may be a virtual gaming peripheral process, a game play process and combinations thereof.

In particular embodiments, the method may also comprise one or more of the following: a) determining the first gaming process is finished using the shared gaming device; and assigning control of the shared gaming device to another gaming process different from the first gaming process, b) receiving a plurality of request to use the shared gaming device from different gaming processes; assigning a priority to each request; and assigning control of the shared gaming device to each gaming process in an order determined from the priority assigned to each request were the priority assigned to each request may be determined from a context in which the shared gaming device is to be used and the priority assigned to a request may change as a function of time, c) generating a list in order of priority of gaming processes waiting to use the shared gaming device, d) assigning a first priority to the first gaming process; while the shared gaming device is controlled by the first gaming process, receiving a second request to use the shared gaming device from a second gaming process; assigning a second priority to the second gaming process that is higher than the second gaming process; and switching control of the gaming device from the first gaming process to the second process.

Another aspect of the present invention provides a method of generating a gaming service in a virtual gaming peripheral process executed on a gaming machine with a gaming operating system that activates and deactivates gaming processes. The method may be generally characterized as including: 1) sending a request to a shared gaming device process manger to use a shared gaming device; 2) receiving control of the shared gaming device; and 3) providing the gaming service using at least the shared gaming device. In particular embodiments, the method may also comprise one or more of the following: a) sending a message that indicates the virtual gaming peripheral process has finished using the shared gaming device, b) receiving a message from the shared gaming device manager is being used and prior to providing the gaming service, waiting to receive control of the shared gaming device and c) prior to completely providing the game service, losing control of the shared gaming device; and terminating the game service.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 1A:
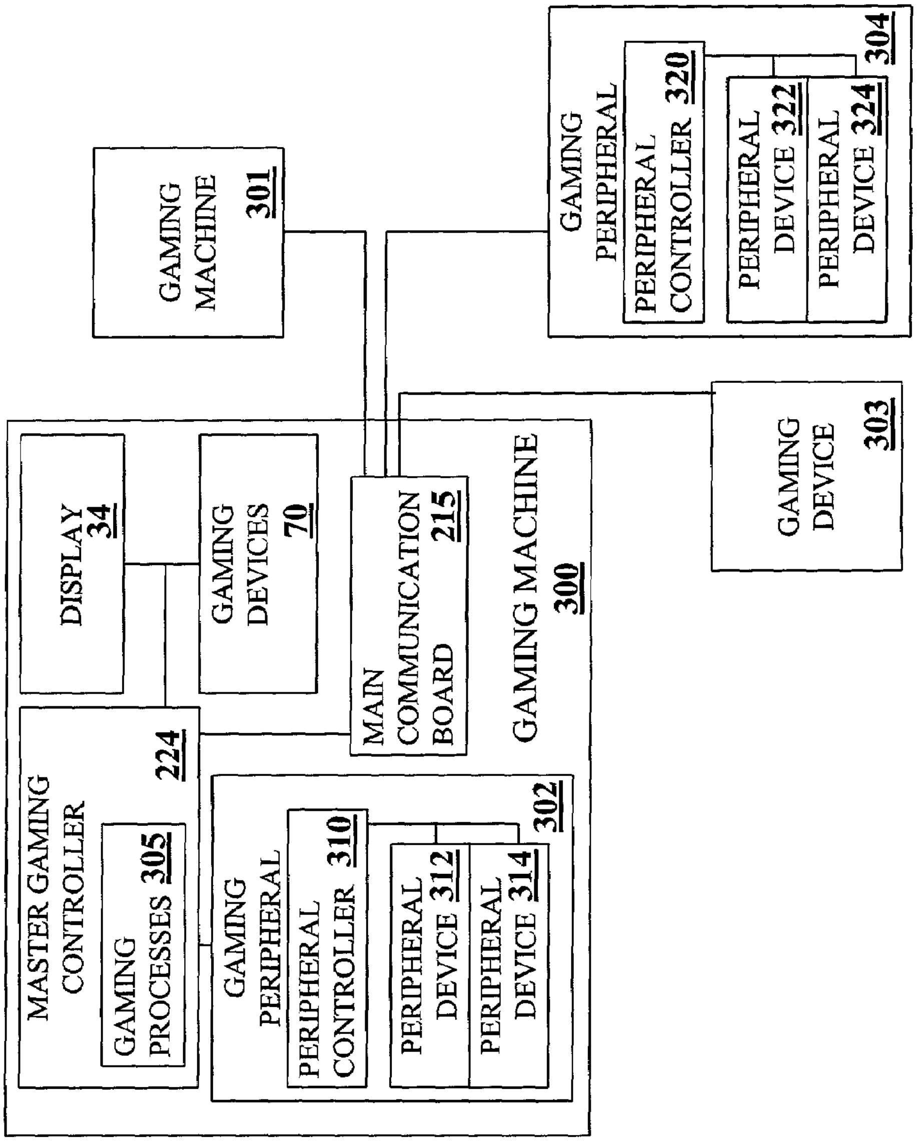
FIG. 1A is a block diagram of a gaming machine connected to a gaming machine, a gaming device and a gaming peripheral.

Concepts important to this invention are "gaming devices," "shared gaming devices," "peripheral devices", "gaming peripherals," "virtual gaming peripherals," "gaming processes," "virtual gaming peripheral processes" and "gaming services." These concepts are initially described with respect to FIG. 1A. Further details of these concepts are described with respect FIGS. 1B-10.

FIG. 1A is a block diagram of a gaming machine 300 connected to a gaming machine 301, a gaming device 303 and a gaming peripheral 304. In the present invention, a virtual gaming peripheral may be used to provide a gaming service at a gaming machine. The virtual gaming peripheral may be comprised of one or more virtual gaming peripheral processes that control one or more gaming devices to provide the gaming service. The virtual gaming peripheral processes are typically software components comprising logic necessary to generate the functions of the virtual gaming peripheral. Preferably, a master gaming controller 224 residing on the gaming machine 300 activates the virtual gaming peripheral processes. In some embodiments, other logic devices such as a peripheral controller 310 or a peripheral controller 320, may be used to activate the virtual gaming peripheral processes.

The master gaming controller 224 or another logic device may activate a plurality of gaming processes 305 including the virtual gaming peripheral processes to perform various gaming functions such as providing a game of chance on the gaming machine or providing various gaming services. In the present invention, gaming processes refer to any software components activated by a logic device such as the master gaming controller 224 or the peripheral controller 310. Thus, the gaming processes are not limited only to gaming processes that provide the game of chance on the gaming machine. For example, player tracking services may be provided on the gaming machine 300. Player tacking services are not required to provide a game of chance on the gaming machine. However, one or more game processes 305, such as virtual gaming peripheral processes, may be activated by the master gaming controller 224 to provide player tracking services. Details of a gaming architecture which may be used to manage gaming processes on a logic device such as master gaming controller 224 are described in co-pending U.S. application Ser. No. 10/040,239 filed on Jan. 3, 2002, by LeMay, et al, and entitled, "Game Development Architecture That Decouples The Game Logic From The Graphics Logic," which is incorporated herein in its entirety and for all purposes.

Gaming services refer to functions provided by the virtual gaming peripherals. Gaming services may be used as part of a play of game of chance on the gaming machine 300 but are not limited to game play. For instance, player tracking services are gaming services that may be provided by a virtual gaming peripheral but are not required to play the game chance or used as part of a game of chance.

Traditionally, gaming devices refer to hardware components, such as coin hoppers, coin acceptors, bill validators and reel assemblies (see FIG. 1B for further details) that are used to play a game of chance on the gaming machine. Traditionally, gaming peripherals are hardware components used with a gaming machine that are used to enhance a game of chance or to play provide a function not directly related to game play. For example, gaming peripheral 304 may be a bonus reel that is activated when certain events occur during game play on gaming machine 300. In this case, the peripheral devices may be a motor 322 that spins the reel and lights 324 that flash. The gaming peripheral 304 may receives commands, "such as spin reels or flash lights," from the master gaming controller 224. These commands may be interpreted by a peripheral controller 320 that drives the peripheral devices. As another example, gaming peripheral 302 may a player tracking unit with the peripheral controller 310 that controls a card reader 312 and a display with touch screen 314. In this case, the gaming peripheral 302 is used to provide player tracking services.

Gaming devices and gaming peripherals may be mounted directly to a gaming machine or located external to the gaming machine. For instance, display 34 and the gaming devices 70 are mounted directly to gaming machine 300 while gaming device 303 is located external to gaming machine 300 but communicates with the gaming machine via a connection to the main communication board 215. Similarly, the gaming peripheral 302 is mounted directly to the gaming machine 300 while the gaming peripheral 304 is located externally to the gaming machine 300 but in communication with the gaming machine via a connection to the main communication board 215.

In the present invention, a gaming device refers to a logical abstraction of one or more hardware components that may be controlled by a virtual gaming peripheral process in a virtual gaming peripheral. A virtual gaming peripheral may control a plurality of gaming devices to provide a game service. Device drivers and device interfaces (see FIGS. 2–4) may be used to provide an interface between the logic abstraction used by the virtual gaming peripheral process and the hardware components. In one embodiment, the gaming device may be a single hardware component, such as a bill validator mounted to the gaming machine 300 or a card reader located on the gaming peripheral 302, and a virtual gaming peripheral process may directly control the gaming device. In another implementation, the gaming device may be a gaming peripheral with a plurality of peripheral devices that is controlled by the virtual gaming peripheral process. In yet another embodiment, the gaming device controlled by the virtual gaming peripheral may be the gaming machine 301 which may include a combination of gaming peripherals with peripheral devices and gaming devices.

The level of logical abstractions used by the virtual gaming peripheral processes may vary. For example, when the gaming device is a hardware component, such as a light panel, the logical abstraction may allow the virtual gaming peripheral process to directly control the functions of the light panel such as flashing individual lights on the panel. In another embodiment, such as when the light panel is located on a gaming peripheral 302, the logical abstraction may be higher such that the virtual gaming peripheral process may send high level commands like "flash lights," to the gaming peripheral 302. The peripheral controller 310 on the gaming peripheral may then interpret the high level command and directly control the light panel. Details of peripheral communication methods that may be used with the present invention are described in U.S. Pat. No. 6,251,014, by Stockdale et al. and titled, "Standard Peripheral Communication," which is incorporated in its entirety and for all purposes.

A plurality of virtual gaming peripheral processes that are used for different virtual gaming peripherals and other gaming processes may be active simultaneously. The virtual gaming peripheral processes and other gaming processes that are simultaneously active may be controlled by a single logic device, such as the master gaming controller 224, or a plurality of logic devices such as the master gaming controller 224, the peripheral controller 310 and the peripheral controller 320. Each active gaming process (virtual gaming processes are one type of gaming process) may control one or more gaming devices. In the present invention, when two or more gaming processes may control the same gaming device, the gaming device is referred to as shared gaming device. For shared gaming devices, the gaming system may have to resolve conflicts that arise when two or more gaming processes desire to control the same gaming device at the same time.

Figure 1B:
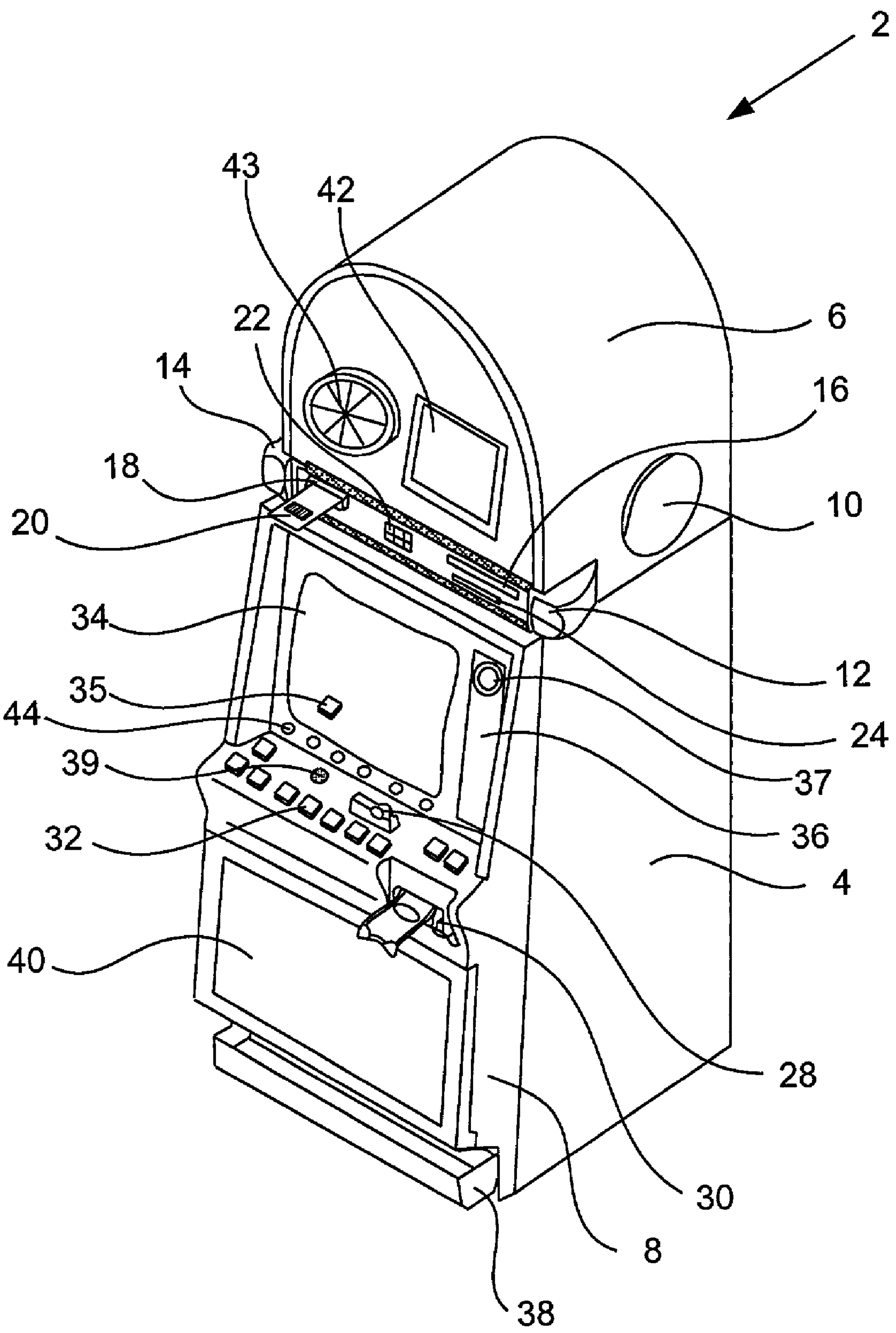
FIG. 1B is a perspective drawing of a gaming machine having a top box and other devices.
Figure 9:
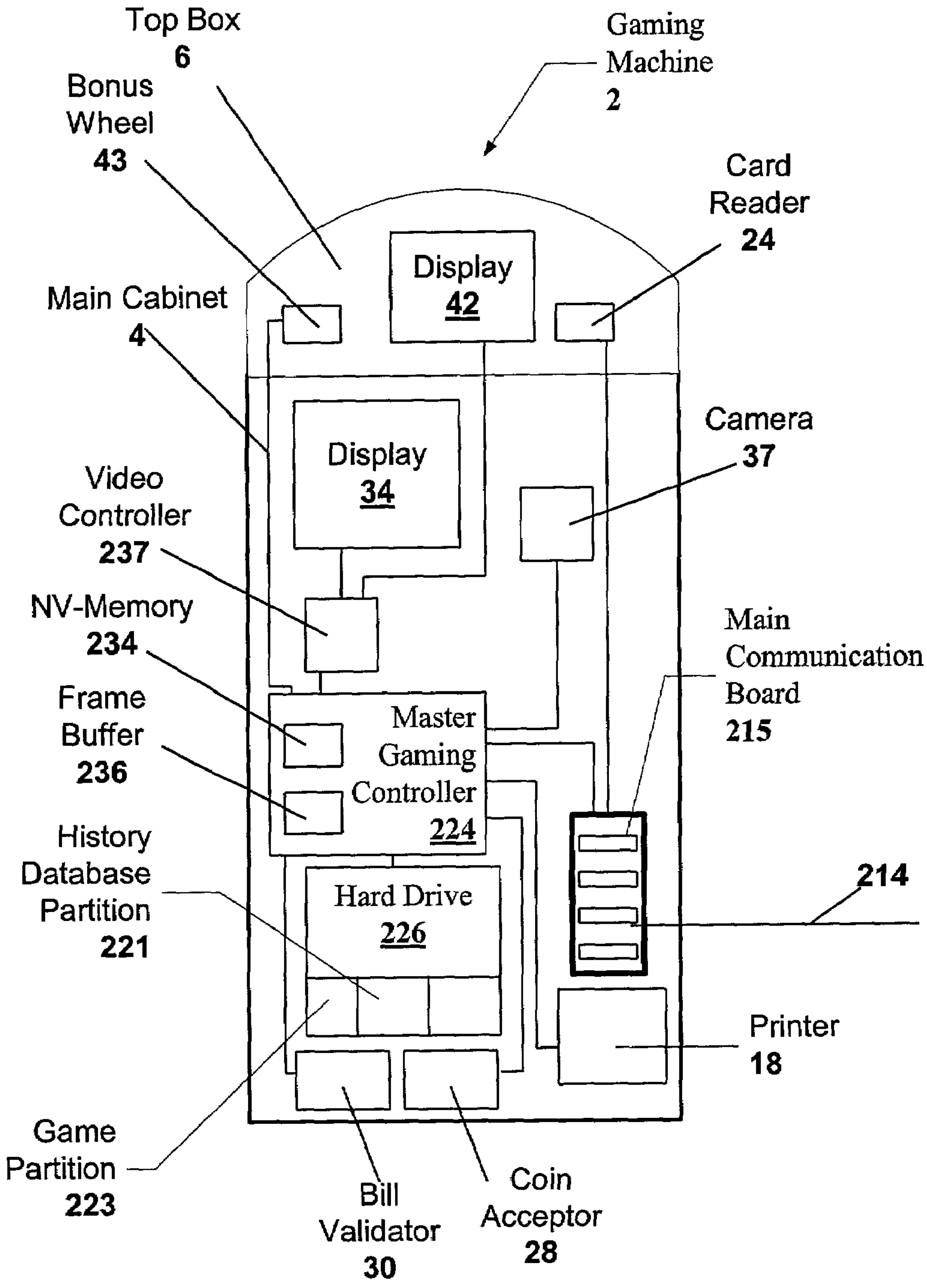
FIG. 9 is a block diagram of a gaming machine of the present invention.
Figure 10:
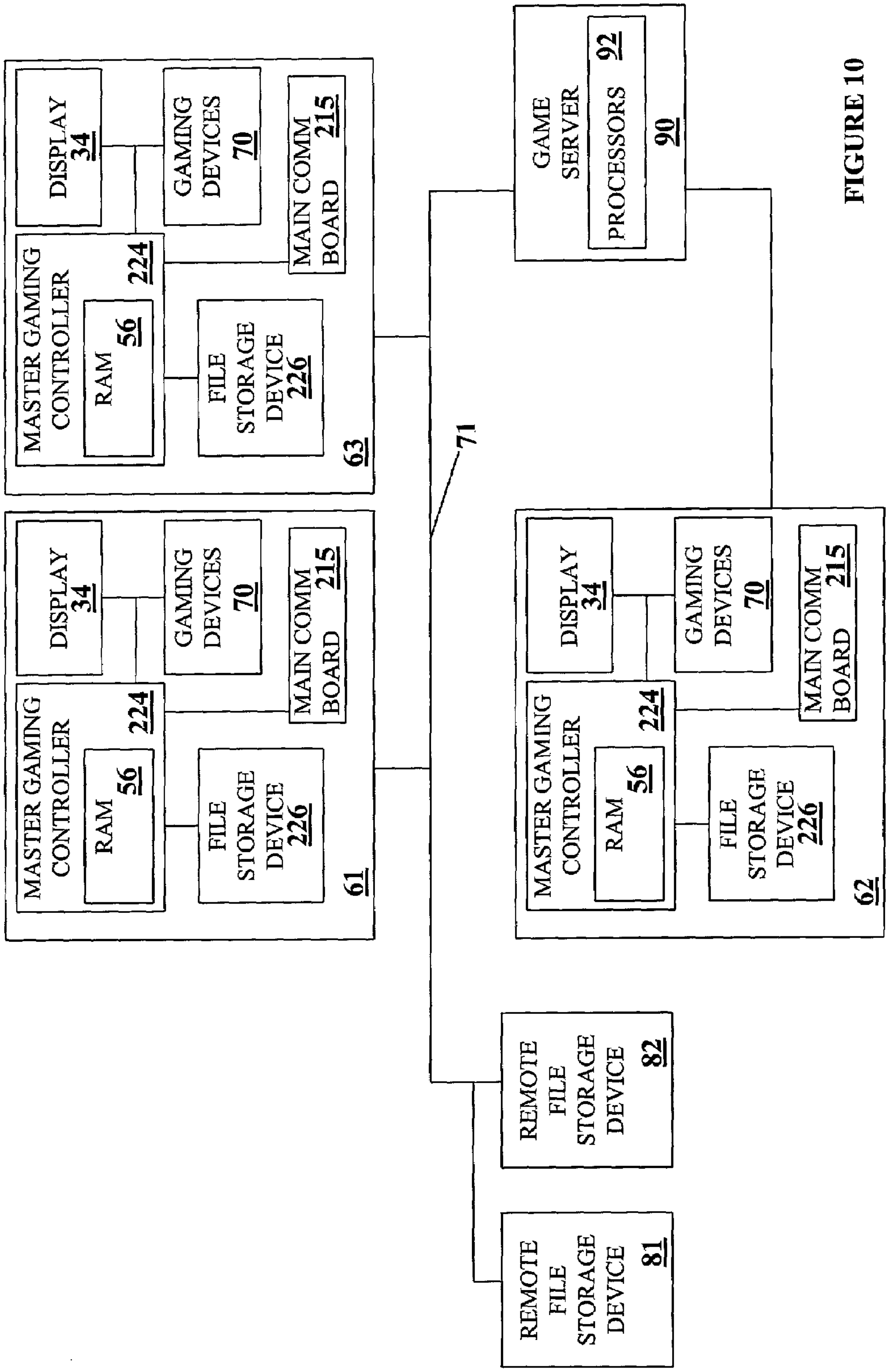
FIG. 10 is a block diagram of gaming machines that utilize distributed gaming software and distributed processors to generate a game of chance for one embodiment of the present invention.

In FIG. 1B, a perspective drawing of video gaming machine 2 of the present invention is shown. The gaming machine comprises many gaming devices that may be used to generate a game of chance as well as to provide additional game services. In FIG. 1B, gaming devices and some of their typical functions are described. In FIGS. 2–8, virtual gaming peripheral processes that may control a combination of gaming devices to provide game services are described. In FIG. 9 and FIG. 10, internal gaming devices and the distribution of gaming devices in a gaming machine network which also may be used by a virtual gaming peripherals are described.

Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. The bill validator 30, coin acceptor 28, player-input switches 32, video display monitor 34, and information panel are traditionally devices used to play a game of chance on the game machine 2. The gaming machine 2 may also include a note dispenser (not shown) used to dispense currency. The devices may be controlled by circuitry, often referred to as a master gaming controller (See FIG. 9), housed inside the main cabinet 4 of the machine 2. Many possible games of chance, including but not limited to traditional slot games, video slot games, video poker, lottery games, card games, pachinko games, board games, keno and dice games, may be provided with gaming machines of this invention.

Viewable through the main door is a video display monitor 34 and an information panel 36. The information panel 36 may be a back-lit, silk screened glass panel with lettering to indicate general game information including, for example, the number of coins played. A light panel 44 is located below the display 34 and in some embodiments may surround the monitor. The light panel 44 may be used to convey information to a game player as well to add excitement to games played on the gaming machine. The gaming machine may include a camera 37 that may serve a variety of functions such as for security and video communication. For instance, the camera 37 may be used for face recognition and may be used for voice recognition. The finger print reader 39 may also be used for security purposes. For example, it may be used to identify a player that is using the gaming machine.

The display monitor 34 will typically be a cathode ray tube, high resolution flat-panel LCD, a plasma display, or other conventional electronically controlled video monitor. The display monitor may be used to present the game of chance or bonus game of chance played on the gaming machine. The display monitor may include a touch screen sensor designed to detect inputs from touch screen buttons 35 displayed on the display screen 34. The touch screen buttons may be used to control a play of a game of chance as well as to provide inputs for game services provided on the gaming machine. The display screen 34 may comprise a single display window or multiple display windows. When multiple display windows are used, multiple games and games services may be provided simultaneously in the plurality of windows. The gaming machine 2 may also include a second display 42. The secondary display may also be a cathode ray tube, high resolution flat-panel LCD, a plasma display, or other conventional electronically controlled video monitor and may include a touch screen sensor. The second display 42 may be used to provide elements of a game of chance, a bonus game, game services, entertainment content and attraction features.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a display 16 for displaying player tracking information and a card reader 24 for entering a magnetic striped card containing player tracking information. Also, a smart card reader that reads smart cards may be used. Further, the top box 6 may house different or additional devices than shown in the FIG. 1B. For example, the top box may contain a bonus wheel 43 or a back-lit silk screened panel which may be used to add bonus features to the game being played on the gaming machine. The top box may also include a secondary display. During a game, these devices may be controlled and powered, in part, by the master gaming controller housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. During the game, the player typically views game information and game play using the video display 34. Using the key pad 22, a display 16 and a card reader 24, the user may also initiate a player tracking session on the gaming machine 2. During the player tracking session, the player may earn loyalty point based upon their game play (e.g., amount of money wagered) that may redeemed for various benefits.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine such as the touch screen button 35. Certain player choices may be captured by player tracking software loaded in a memory inside of the gaming machine. For example, the rate at which a player plays a game or the amount a player bets on each game may be captured by the player tracking software. The player tracking software may utilize the non-volatile memory storage device to store this information (see FIG. 9).

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights 44 on the gaming machine 2 or from lights behind the belly glass 40. The bonus wheel 43 may also spin and lights on the wheel may flash to provide various visual effects. After the player has completed a game, the player may receive coins or game tokens from the coin tray 38 or the ticket 20 from the printer 18, which may be used for further games or to redeem a prize. Further, the player may receive a ticket 20 for food, merchandise, or games from the printer 18.

Figure 2:
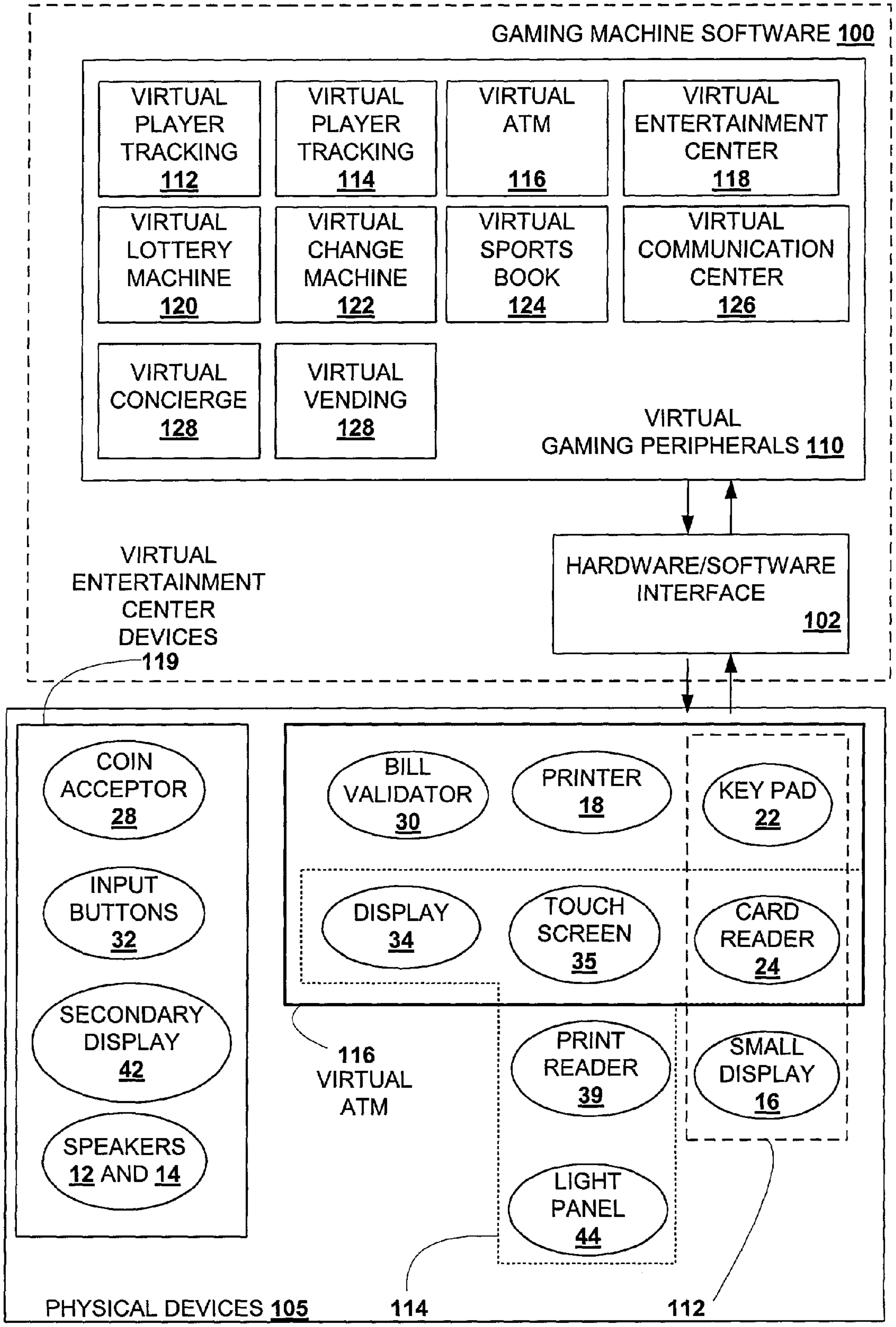
FIG. 2 is a block diagram of a gaming machine with virtual gaming peripheral software modules that control various gaming devices.

FIG. 2 is a block diagram of a gaming machine with virtual gaming peripheral software modules 110 that may be used to control various gaming devices to provide a gaming service. In the present invention, the virtual gaming peripheral software modules are a component of gaming machine software 100 that may be executed as processes by a gaming operating system (see FIGS. 3 and 4). In one embodiment, the gaming operating system is part of the master gaming controller of the gaming machine (see FIG. 9). However, logic devices separate from the master gaming controller may also be used to execute one or more virtual gaming peripheral processes. Using the hardware/software interface 102 (described in more detail with respect to FIG. 3), each virtual gaming peripheral may be used to control a combination of physical gaming devices 105 residing on the gaming machine or remote to the gaming machine but in communication with the gaming machine to provide at least one gaming service.

Examples of virtual gaming peripherals 110 include but are not limited to 1) virtual player tracking 112 and 114 which may be used to provide player tracking services, 2) a virtual Automatic Teller Machine (ATM) 116 which may allow the gaming machine to provide fund transfers and monetary account management, 3) a virtual entertainment center 118 which may allow the gaming machine to provide one or more entertainment services besides game play to the game player, 4) a virtual lottery machine 120 that may allow a player to purchase a lottery ticket of some sort at the gaming machine, 5) a virtual change machine 122 that may allow a player to obtain change at a gaming machine, 6) a virtual sports book 124 that may allow a player to make a wager on an event at the gaming machine, to monitor events, to receive results and to cash out a winning event ticket, 7) a virtual communication center 125 that may allow a player to communicate with other game players, other individuals, send and receive e-messages and locate other players, 8) a virtual concierge 128 that allows a player to learn about and obtain various hotel/casino, restaurant, entertainment and travel services , 9) a virtual vending machine 128 that allows a player to purchase various vending items at the gaming machine and 10) a virtual kiosk (not shown) that allows for Internet enabled services, such as web-browsing, and registration services such as for a loyalty program. The virtual vending machine 128 may allow a gaming machine to dispense items directly to the player or allow the player to order an item which is brought to the player. Details of a virtual player tracking gaming peripheral are described in co-pending U.S. application Ser. No. 09/642,192, filed Aug. 18, 2000, by LeMay, et al. and entitled, "Virtual Player Tracking and Related Services," which is incorporated herein in its entirety and for all purposes. Details of a entertainment content which may be provided with a virtual entertainment center gaming peripheral, such as 118, are described in co-pending U.S. application Ser. No. 09/665, 526, filed Sep. 19, 2000, by LeMay, et al and entitled, "Play Per View," which is incorporated herein in its entirety and for all purposes.

As described above, each virtual gaming peripheral, which may be a process executed on the gaming machine, may control a combination of gaming devices in the physical gaming devices 105 to provide a gaming service. Four examples of gaming device combinations are shown for illustrative purposes. The device combinations used by a virtual gaming peripheral may vary according to the gaming devices available on a particular gaming machine. As an example of device combinations that may be used by virtual gaming peripherals, the virtual ATM 116 may control the bill validator 30, the printer 18, the key pad 22, the display 34, the card reader 24 and the touch screen 35 to provide ATM services. The card reader 22 may be used to accept an ATM card. The key pad 22 may be used to enter a pin number. The bill validator 30 may be used to accept cash or printed tickets with a cash value. Funds entered into the gaming machine may be transferred to a bank account. The display 34 and the touch screen 35 may be used to display and select various ATM services. The printer 18 may be used to provide receipts and print cashless tickets which may be used for game play in other gaming machines.

A virtual sports book 124 and the virtual lottery machine 120 may also provide services using the combination of devices described for the virtual ATM 116. However, the context in which the devices are used may be different. For instance, the printer 18 may be used to print a lottery ticket for the virtual lottery machine 120 and a wager ticket for the virtual sports book 124 instead of a receipt. Also, the display 34 and touch screen 35 may be used to display and make lottery and sports bets selections instead of ATM selections. The contexts in which different gaming devices may be used by different virtual gaming peripherals are tracked by software on the gaming machine and are described in further detail with respect to FIGS. 3 and 4.

As another example, a virtual entertainment center peripheral 118 may control a coin acceptor 28, input buttons 32, the secondary display 42 and speakers 12 and 14 to provide entertainment sources to a player. In one embodiment, the virtual entertainment center 118 may act as a musical video jukebox. Using the input buttons 32, a player may select musical videos, which are output on the secondary display 42 and speakers 12 and 14. In another embodiment, the player may be able to select a musical format, which is output on speakers 12 and 14. In yet another embodiment, the player may be able to watch a sporting event on the secondary display while playing a game on the gaming machine. In some cases, the player may be required to deposit money via the coin acceptor 28 to use the virtual entertainment center.

In yet another example of virtual gaming peripheral, a virtual player tracking gaming peripheral (112 and 114) may be used to control a combination of gaming devices to provide player tracking services. In the present invention, different combinations of gaming devices may be used to provide the same gaming service. For instance, the first virtual player tracking peripheral 112 uses the key pad 22, the card reader 24 and the small display 16 to provide player tracking services. In another embodiment, instead of the small display 16, a portion of the large display 34, i.e. via "picture in a picture," may also be used. To start a player tracking session, the player insert a player tracking card in the card reader 24, enters a PIN number using the key pad 22 and receive player tracking information via the small display 16. The second virtual player tracking peripheral 114 uses the display 34, the touch screen 35, the card reader 24, a finger print reader 39 and a light panel 44. To start a player tracking session, the player insert a player tracking card in the card reader 24, provides finger print information via the print reader 39 and receives player tracking information via the display 34. Using the touch screen 35, the player may be able to select choices from player tracking service menus and interfaces displayed on the display 34. The light panel 44 may be used to convey to a player operational information. For example, the light panel may change color or flash when a player has inserted their player tracking card incorrectly in the gaming machine.

In the present invention, one or more virtual gaming peripherals 110 as well as game play processes on the gaming machine may share the same gaming device. For instance, the card reader 24 may be used by the virtual ATM peripheral 116, the first virtual player tracking peripheral 112 and the second virtual player tracking peripheral 114. As another example, the bill validator 30 may be used by the virtual ATM peripheral 116 and by the master gaming controller on the gaming machine.

Traditionally, gaming devices have not been shared by different software elements or processes executing on the gaming machine and the functions of a particular gaming device have been fairly limited. For example, card readers on gaming machine are typically used only to read player tracking information from player tracking cards. As another example, the bill validator 30 is typically used only to insert credits into the gaming machine. Thus, conflicts between different gaming processes wishing to use a gaming device at the same time have not generally had to be considered on gaming machines.

In the present invention, since a given gaming device may be shared by multiple software entities, the context in which a given device is being used may be important. For example, a player tracking session is usually initiated when a player inserts a player tracking card into the card reader 24. When a card is inserted into the card reader 24, one of the virtual player tracking peripherals (e.g., 112 or 114) may detect the insertion of the card an initiate the player tracking session. When the virtual ATM peripheral 116 is active, the player may insert an ATM card into the card reader 24 to begin ATM services (inserting the card may also activate the ATM peripheral if it is not active). Thus, one possible scenario using the card reader 24 is that the player has requested an ATM service, the virtual ATM peripheral 116 is given control of the card reader 24 and the peripheral is waiting for the player to insert an ATM card into the card reader 24. If the player mistakenly inserts a player tracking card into the card reader 24. The virtual ATM 116 may generate an error because the player tracking card is not an ATM card. When the virtual ATM peripheral 116 and the virtual player tracking peripheral (112 or 114) may be operating simultaneously, logic on the gaming machine may be required to determine in the situation described above whether a player tracking session is to be initiated or an error is to be generated.

In general, when a gaming device is shared by two or more entities, such as two or more virtual gaming peripheral processes or a virtual gaming peripheral process and another gaming process executed on the gaming machine, and when situations occur where the two or more entities may want to use simultaneously the same shared gaming device, shared gaming device logic may be required to arbitrate control of the shared gaming device. In traditional gaming machines, arbitrating control of a shared gaming device is generally not an issue because most gaming devices are usually either controlled by a single process or used for a single purpose.

Control of the shared by gaming device may be determined according to the context in which the device is being used. For instance, using the coin acceptor 28 in the context of entering credits to the gaming machine may be given priority over using the coin acceptor in the context to make change using the virtual change machine 122 or to purchase items from the gaming machine using the virtual vending machine 128. Details of the shared gaming device logic used with the present invention are described in more detail with respect to FIGS. 3, 4, 6 and 8.

One advantage of using virtual gaming peripherals and shared gaming devices is more robustness and flexibility in maintaining gaming machine functionality. When a gaming device fails using the virtual gaming peripherals, it may be easier to maintain gaming machine functionality because a new virtual gaming peripheral process may be loaded that provides the same functionality without using the failed gaming device. For instance, if player tracking services are provided on a gaming machine using the virtual player tracking peripheral 112, which uses the small display 16, the card reader 24 and the key pad 22, and the key pad 22 fails or the small display 16 fails, the second virtual player tracking peripheral 114 may be activated which does not use either of these devices. Thus, with the present invention, the player tracking services, i.e., the functionality, of the gaming machine may be maintained until the faulty device is replaced by simply activating a new virtual gaming peripheral.

Another advantage of using virtual gaming peripherals and shared gaming devices is more flexibility in increasing gaming machine functionality without adding hardware to the gaming machine. With virtual gaming peripherals, combinations of gaming devices used to provide gaming services may be easily modified. These combinations may be chosen in a manner to maximize device utilization on the gaming machine such that more opportunities for additional revenues and better customer service are provided. For instance, as described above, the light panel 44 installed on the gaming machine may be used with the virtual player tracking peripheral 114 to convey information to the player as well as to add excitement to the play of a game. With current player tracking units, a lighting device for this purpose may be built into the player tracking unit which is installed on the gaming machine. To upgrade a gaming machine without this functionality, the player tracking unit is replaced. With the present invention, the ability to convey information to a player using a lighting device may be accomplished by installing a virtual player tracking peripheral, such as 114, on the gaming machine that uses a lighting device already available on the gaming machine such as the light panel 44. Thus, the ability to convey information to the player is obtained without replacing or adding hardware to the gaming machine.

Figure 3:
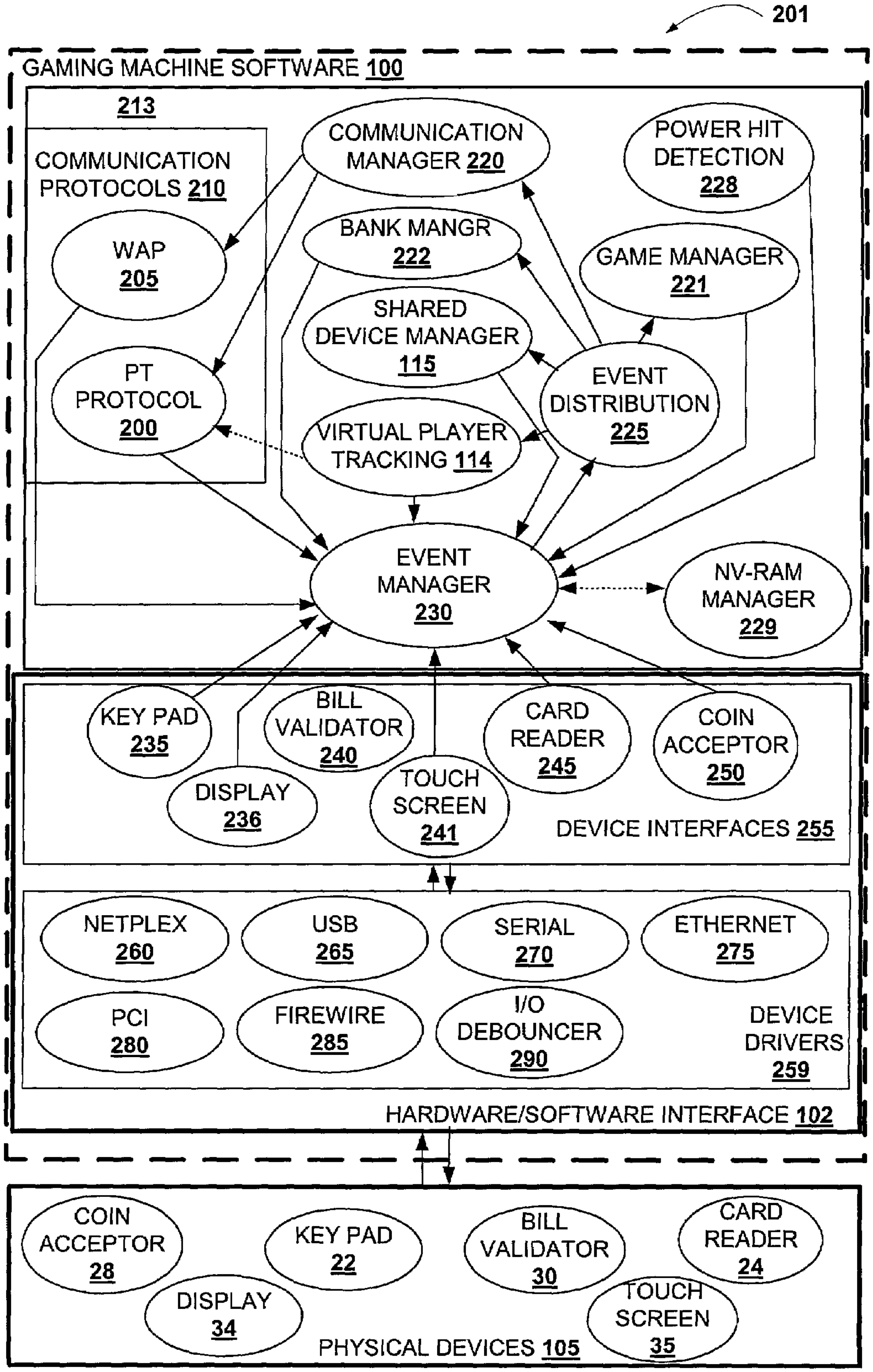
FIG. 3 is a block diagram depicting a gaming machine software architecture in a gaming machine with virtual gaming peripherals.

Various hardware and software architectures may be used to implement the virtual gaming peripherals and shared gaming devices of the present invention. FIG. 3 is a block diagram depicting one suitable example of gaming machine software elements 100 in a gaming machine with a software architecture 201 employing a NV-RAM manager 229 to access a physical non-volatile memory storage device 234 as described with reference to FIG. 9. The NV-RAM manager is a "process" executed by an operating system 213 residing on the gaming machine. A "process" is a separate software execution module that is protected by the operating system executed by a microprocessor on the master gaming controller 224 (See FIG. 9). When a process, including the NV-RAM manger 229, is protected, other software processes or software units executed by the master gaming controller 224 can not access the memory of the protected process.

The operating system 213 used to implement the gaming software architecture of the present invention may be one of a number of commercially available operating systems, such as QNX by QNX Software Systems, LTD of Kanata, Ontario, Canada which is Unix based, Windows NT and MS Windows 2000 by Microsoft Corporation of Redmond, Wash. or Linux by Redhat, Durham, N.C., which is an open source Unix based operating system. Different operating systems may use different definitions of processes. In QNX, the processes are protected. With other operating systems, a "process" may be dedicated logic that is executed. Using different operating systems, many different implementations of the present invention are possible and the present invention is not limited to the constraints of a particular operating system.

The NV-RAM manager 229 controls access to the non-volatile memory on the gaming machine. By using the NV-RAM manager 229, the gaming processes and virtual gaming peripheral processes may share the non-volatile memory resource at the same time. Thus, the non-volatile memory usage is optimally used which may lower the costs associated with adding new functions to the gaming machine.

Other processes that may be considered part of the operating system include but are not limited to a communication manager 220, a bank manager 222, an event manager 230, a game manager 221, a power hit detection process 228, a shared gaming device manager 115 and a virtual gaming peripheral process 114. The virtual gaming player tracking peripheral process 114 may be used to provide player tracking services using the card reader 24, the key pad 22, the finger-print reader 39 and the light panel 44 as described with respect to FIG. 2. The shared gaming device manager 115 may be used to arbitrate control of one or more shared gaming devices on the gaming machine. For instance, for each shared gaming device, a separate shared gaming device manager process may be used to arbitrate control of the shared gaming device. As another example, a shared gaming device manager process may be used to arbitrate control of multiple shared gaming devices. In general, a gaming machine may include multiple shared gaming device manager processes that each manage one or more shared gaming devices (see FIG. 4).

Figure 6:
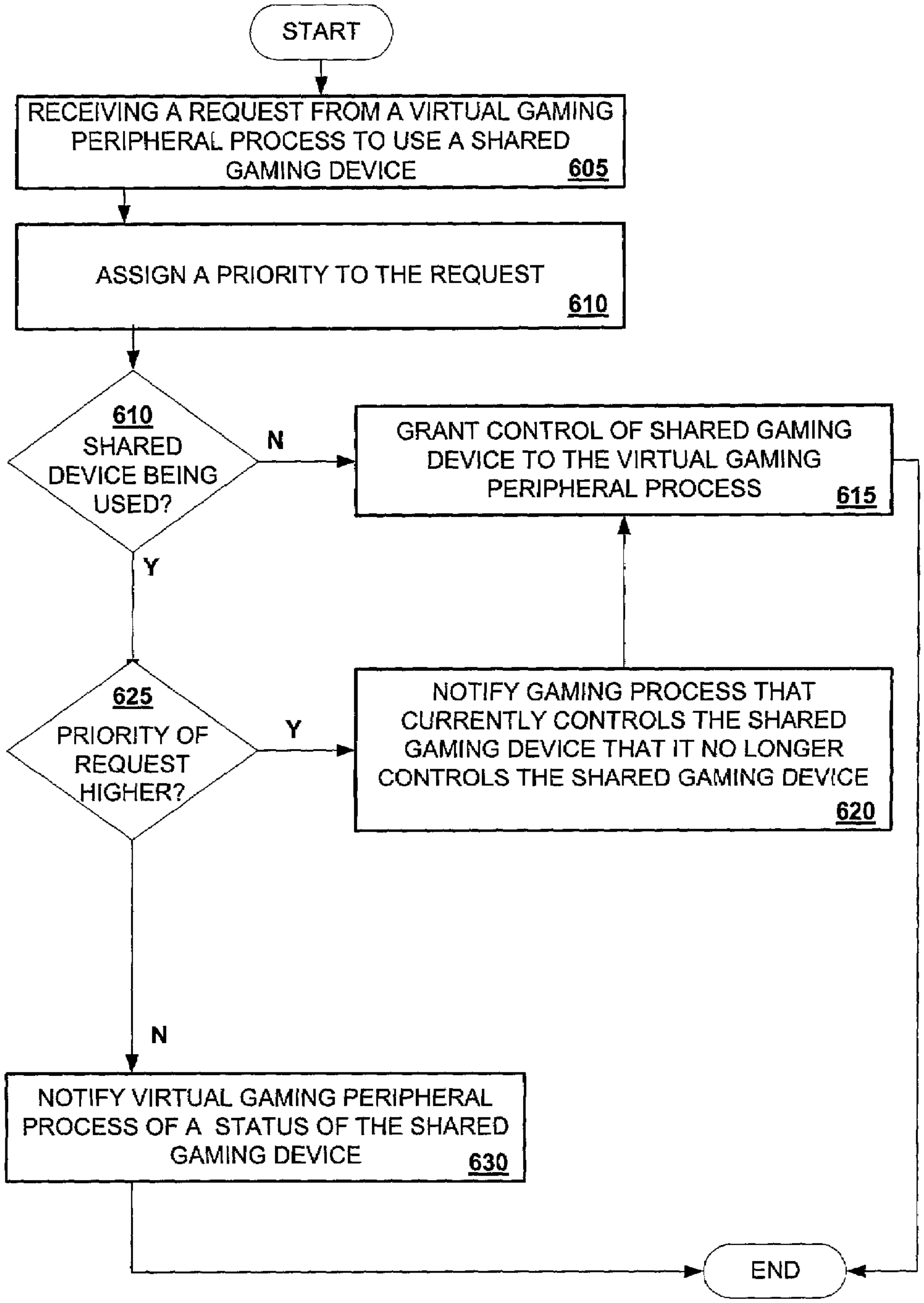
FIG. 6 is a flow chart depicting a method of arbitrating control of shared gaming devices on a gaming machine.

In one embodiment, the shared gaming device manager 115 arbitrates requests to use a shared gaming device, such as the card reader 24 or the bill validator 30, from the different gaming processes within the gaming operating system and determines which entity is given access to the shared gaming device, based on priority settings (see FIG. 6). The gaming processes that may request control of a shared gaming device include but are not limited to 1) a virtual gaming peripheral process, such as the virtual player tracking process 114 and 2) a game play process, such as the bank manager 222 or the game manager 221. At any given time, multiple entities may try to obtain control of one of the shared gaming devices. For example, when the card reader 24 is used to read player tracking cards and debit cards, the virtual player tracking peripheral process 114 and the bank manager process 222 may try to gain control of the card reader 24. This creates a need for one entity, e.g. the shared gaming device manager 115, to determine to whom and under what circumstances control of the card reader 24 is granted.

As described in more detail below, the shared gaming device manager listens to and responds to game events passed through the event manager 230 and event distribution 225 specifically those that are requests for any of its known contexts to enter or exit. A context is a logically defined situation where a gaming process may request control of a particular shared gaming device. A gaming process may generate contexts for more than shared gaming device. For instance, the virtual player tracking peripheral process 114 may generate contexts for the display 34, the touch screen 35, the card reader 24 and the light panel 44. The display 34, the touch screen 35, the card reader 24 and the light panel 44 may all be shared gaming devices. There are at least two circumstances under which the shared device manager 115 may grant control of the shared gaming device: 1) the current context is finished using the shared gaming device or 2) a higher priority context requires access to the shared gaming device.

Event based requests are one method of controlling access to a shared gaming device. Another method are arbitrated requests that are sent directly to a shared gaming device manager or a similar process. In the present invention, event based request, arbitrated request or combinations thereof may be used.

The display 34 is one example of a gaming device that may also be a shared gaming device. Contexts that may request access to the display screen 34 include but are not limited to: a) a menu context that displays machine menu for maintenance situations, b) a tilt context that displays tilts including hand pays for tilt situations, c) a game context that displays regular game play, bonus games and cash outs, d) an attract context that displays attract menus in attract situations, and e) a main menu context that displays a game selection menu and other game service menus available on the gaming machine. The contexts for the display 34 may be generated by various gaming processes active on the gaming machine. For instance, in one embodiment, game service menu contexts may be generated by one or more virtual gaming service peripherals, such as the virtual player tracking process 114. As another example, the game context may be generated by the game manager process 221. Thus, the display 34 is a device that may be shared multiple times. A practical limit may be applied to the display 34 or any other shared gaming device to keep the resource from being entirely exhausted.

The contexts described above for the display 34 may be prioritized. In one embodiment, the priorities for the display may be prioritized in descending order from highest to lowest, as the machine menu context, the tilt context, the game context, bonus game context, the attract context and the main menu context. In general, the priorities assigned to contexts for a shared gaming device are fixed. However, variable priorities may also be used for some contexts of the shared gaming device. As an example, the priorities of attract mode contexts generated by different virtual gaming peripherals may be increased or decreased as a function of time to emphasize a particular game service. Thus, a priority for an attract mode context for a particular game service provided by a virtual gaming peripheral may be increased at particular times such that the attract mode context is displayed more often than other attract mode contexts generated by other gaming processes during the time when its priority is increased. For example, an attract mode context that allows a patron to make a dinner reservation or an entertainment reservation may be emphasized more by increasing its priority in the early afternoon or at other times when the patron may desire these services.

Some parts of the gaming machine software 201 are communication protocols 210, an event manager 230 and event distribution 225, device interfaces 255, device drivers 259, the game manager 221 which interfaces with gaming processes used to generate the game of chance, game resources such as the bank manager 222, the NV-RAM manager 229 and the communication manager 220, which may be used by other processes, the virtual gaming peripheral processes, such as the virtual player tracking 114, and the shared device manager process 115 that arbitrates control of one or more shared gaming devices. These software modules comprising the gaming machine software 201 may be loaded into memory of the master gaming controller 224 (see FIGS. 9 and 10) of the gaming machine at the time of initialization of the gaming machine. The game operating system (OS) may be used to load and unload the gaming software modules from a mass storage device on the gaming machine into RAM for execution as processes on the gaming machine. The gaming OS may also maintain a directory structure, monitor the status of processes and schedule the processes for execution. During game play on the gaming machine, the gaming OS may load and unload processes from RAM in a dynamic manner.

The NV-RAM manager 229 is a protected process on the gaming machine to maintain the integrity of the non-volatile memory space on the gaming machine. All access to the non-volatile memory may be through the NV-RAM manager 229 via a defined API. During execution of the gaming machine software 100, the non-volatile manager 229 may receive access requests via the event manager 230 from other processes, including a bank manager 222, a game manager 221, virtual player tracking 114 and one or more device interfaces 255 to store or retrieve data in the physical non-volatile memory space. Other software units that request to read, write or query blocks of memory in the non-volatile memory are referred to as clients.

The device interfaces 255, including a key pad 235, a display 236, a card reader 245, a coin acceptor 250, a bill validator 240 and a touch screen 241, are software units that provide an interface between the device drivers and the gaming processes active on the gaming machine. The device interfaces 255 may receive commands from virtual gaming peripherals requesting an operation for one of the physical devices. For example, in one context, the virtual player tracking peripheral 114 may send a command to the display interface 236 requesting that a message of some type be displayed on the display 34. The display interface 236 sends the message to the device driver for the display 34. The device driver for the display communicates the command and message to the display 34 allowing the display 34 to display the message. When the display 34 may be controlled by more than one gaming process (e.g., the game manager 221 may use the display 34 to present the game of chance), the shared device manager 115 or a similar process may assign a priority to the context generated by the virtual player tracking peripheral 114 and grant control of the display 34 to the context depending on whether the display 34 is currently in use. If the display 34 is in use, the shared device manager may determine whether the current context using the device should be switched out for the context generated by the virtual player tracking peripheral 114.

The device interfaces 255 also receive game events from the physical devices. A game event is an event generated from any active game process such as active virtual gaming peripheral processes and active game play processes. In general, a game event may be received by the device interfaces 255 by polling or direct communication. The solid black arrows indicate event paths between the various software units. Using polling, the device interfaces 255 regularly communicate with the physical devices 105 via the device drivers 259 requesting whether an event has occurred or not. Typically, the device drivers 259 do not perform any high level event handling. For example, using polling, the card reader 245 device interface may regularly send a message to the card reader physical device 24 asking whether a card has been inserted into the card reader. Using direct communication, an interrupt or signal indicating a game event has occurred is sent to the device interfaces 255 via the device drivers 259 when a game event has occurred. For example, when a card is inserted into the card reader, the card reader 24 may send a "card-in message" to the device interface for the card reader 245 indicating a card has been inserted which may be posted to the event manager 230. The card-in message is a game event. Other examples of game events which may be received from one of the physical devices 105 by a device interface, include 1) Main door/Drop door/Cash door openings and closings, 2) Bill insert message with the denomination of the bill, 3) Hopper tilt, 4) Bill jam, 5) Reel tilt, 6) Coin in and Coin out tilts, 7) Power loss, 8) Card insert, 9) Card removal, 10) Promotional card insert, 11) Promotional card removal, 12) Jackpot and 13) Abandoned card.

Typically, the game event is an encapsulated information packet of some type posted by the device interface. The game event has a "source" and one or more "destinations." Each game event contains a standard header with additional information attached to the header. The additional information is typically used in some manner at the destination for the event.

As an example, the source of the card-in game event may be the card reader 24. The destinations for the card-in game event may be the bank manager 222, the communication manager 220 and the virtual player tracking manager 114. The communication manager 220 may communicate information read from the card to one or more devices located outside the gaming machine. When the magnetic striped card is used to deposit credits into the gaming machine, the bank manager 222 may prompt the card reader 24 via the card reader device interface 255 to perform additional operations. When the magnetic striped card is used to initiate a player tracking session, the virtual player tracking peripheral 114 prompt the card reader 24 via the card reader device interface 255 to perform additional operations related to player tracking. Since multiple contexts may be applied to the card-in event, a shared device manager, such as 115, may be used to determine which context is granted control of the gaming device. For example, the shared device manager 115 may grant control of the card reader to either bank manager 222 or the virtual player tracking peripheral 114.

A game event may be created when an input is detected by one of the device interfaces 255. Game events may also be created by one game process and sent to another game process. For example, when a shared gaming device manager 115 grants control of one shared gaming device to a context, a game event may be generated. Game events may also be generated from entities located outside the gaming machine. For example, one gaming machine may send a game event to another gaming machine via the communication manager 220. The game events are distributed to their one or more destinations via a queued delivery system using the event distribution software process 225. However, since the game events may be distributed to more than one destinations, the game events differ from a device command or a device signal which is typically a point to point communication such as a function call within a program or interprocess communication between processes.

Since the source of the game event, which may be a device interface or a server outside of the gaming machine, is not usually directly connected to destination of the game event, the event manager 230 acts as an interface between the source and the one or more event destinations. After the source posts the event, the source returns back to performing its intended function. For example, the source may be a device interface polling a hardware device. The event manager 230 processes the game event posted by the source and places the game event in one or more queues for delivery. The event manager 230 may prioritize each event and place it in a different queue depending on the priority assigned to the event. For example, critical game events may be placed in a list with a number of critical game transactions stored in the NV-RAM as part of a state in a state-based transaction system executed on the gaming machine.

After a game event is received by the event manager 230, the game event is sent to event distribution 225 in the gaming system 213. Event distribution 225 broadcasts the game event to the destination software units that may operate on the game event. The operations on the game events may trigger one or more access requests to the NV-RAM via the NV-RAM manager 229. Further, when one or more software units may request control of a shared gaming device in response to the event, then a shared device manager may be used to arbitrate the request. For instance, when a player enters a bill into the gaming machine using the bill validator 30, this event may arrive at the bank manager 222 after the event has passed through the device drivers 259, the bill validator device interface 240, the event manager 230, and the event distribution 225 where information regarding the game event such as the bill denomination may be sent to the NV-RAM manager 229 by the event manager 230. After receiving the game event, the bank manager 222 evaluates the game event and determines whether a response is required to the game event. For example, the bank manager 222 may decide to increment the amount of credits on the machine according to the bill denomination entered into the bill validator 30. Further, the bank manager 222 may request control of the bill validator. When the bill validator 30 is a shared gaming device, the request may be arbitrated by a shared gaming device manager. Thus, one function of the bank manager software 222 and other software units is as a game event evaluator. More generally, in response to the game event, the bank manager 222 may 1) generate a new event and post it to the event manager 230, 2) send a command to the device interfaces 255, 3) send a command or information to the wide area progressive communication protocol 205 or the player tracking protocol 200 so that the information may be sent outside of the gaming machine, 4) do nothing or 5) perform combinations of 1), 2) and 3).

Non-volatile memory may be accessed via the NV-RAM manager 229 via commands sent to the gaming machine from devices located outside of the gaming machine. For instance, an accounting server or a wide area progressive server may poll the non-volatile memory to obtain information on the cash flow of a particular gaming machine. The cash flow polling may be carried out via continual queries to the non-volatile memory via game events sent to the event manager 230 and then to the NV-RAM manager 229. The polling may require translation of messages from the accounting server or the wide area progressive server using communication protocol translators 210 residing on the gaming machine.

The communication protocols typically translate information from one communication format to another communication format. For example, a gaming machine may utilize one communication format while a server providing accounting services may utilize a second communication format. The player tracking protocol translates the information from one communication format to another allowing information to be sent and received from the server. Two examples of communication protocols are wide area progressive 205 and player tracking protocol 200. The wide are progressive protocol 205 may be used to send information over a wide area progressive network and the player tracking protocol 200 may be used to send information over a casino area network. The server may provide a number of gaming services including accounting and player tracking services that require access to the non-volatile memory on the gaming machine.

The power hit detection software 228 monitors the gaming machine for power fluctuations. The power hit detection software 228 may be stored in a memory different from the memory storing the rest of the gaming machine software 100. When the power hit detection software 228 detects that a power failure of some type may be eminent, an event may be sent to the event manger 230 indicating a power failure has occurred. This event is posted to the event distribution software 225 which broadcasts the message to all of the software units and devices within the gaming machine that may be affected by a power failure.

Device interfaces 255 are utilized with the gaming machine software 213 so that changes in the device driver software do not affect the gaming system software 213 or even the device interface software 255. For example, the gaming events and commands that each physical device 105 sends and receives may be standardized so that all the physical devices 105 send and receive the same commands and the same gaming events. Thus, when one of the physical devices 105 is replaced, a new device driver 259 may be required to communicate with the physical device. However, device interfaces 255 and gaming machine system software 213 remain unchanged. When the new physical device requires a different amount of NV-RAM from the old physical device, an advantage of the NV-RAM manager 229 is that the new space may be easily allocated in the non-volatile memory without reinitializing the NV-RAM. Thus, the physical devices 105 utilized for player tracking services may be easily exchanged or upgraded with minimal software modifications.

The various software elements described herein (e.g., the device drivers, device interfaces, communication protocols, etc.) may be implemented as software objects or other executable blocks of code or script. In a preferred embodiment, the elements are implemented as C++ objects. The event manager, event distribution, software player tracking unit and other gaming system 213 software may also by implemented as C++ objects. Each are compiled as individual processes and communicate via events and/or interprocess communication (IPC). Event formats and IPC formats may be defined as part of one or more Application Program Interfaces (APIs) used on the gaming machine. This method of implementation is common with the QNX operating system.

The operating system and its components have been described in the context of a gaming machine. The operating system may be executed by a master gaming controller on the gaming machine. The present invention is not so limited. Gaming processes may also be activated by operating systems executed by logic devices different from the master gaming controller on the gaming machine. For instance, a gaming peripheral mounted to a gaming machine may include a logic device that executes an operating system. The operating system on the gaming peripheral may be the same or different from the operating system executing on the master gaming controller on the gaming machine. The gaming peripheral may comprise one or more gaming devices. Like the gaming machine activating a virtual gaming peripheral process that controls gaming devices located on the gaming peripheral, the logic device on the gaming peripheral may activate virtual gaming peripheral processes that control gaming devices located on the gaming peripheral and the gaming machine. In this embodiment, when a gaming process executed by the gaming peripheral and a gaming process executed by the master gaming controller desire control of the same gaming device at the same time, logic residing on the master gaming controller, the logic device of the gaming peripheral or combinations thereof, may be used to arbitrate process conflicts.

Figure 4:
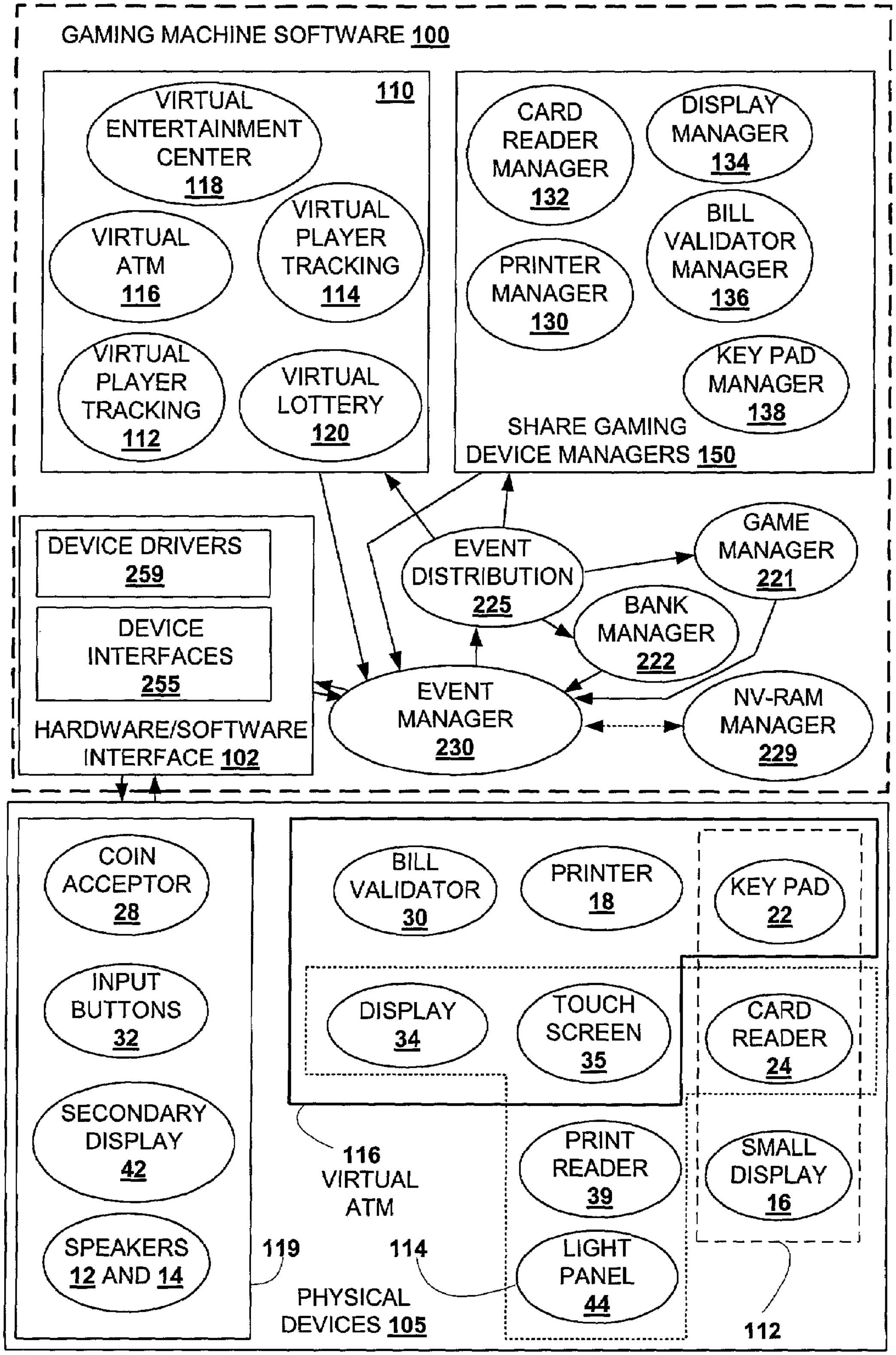
FIG. 4 is a block diagram depicting a plurality virtual gaming peripheral processes that control gaming devices using the software architecture described with respect to FIG. 3.

FIG. 4 is a block diagram depicting a plurality virtual gaming peripheral processes 110 that control gaming devices using the software architecture described with respect to FIG. 3. The number of virtual gaming peripheral processes active on the gaming machine may vary as a function of time. A plurality of different virtual gaming peripheral processes may be stored on a memory device on the gaming machine or available to the gaming machine via remote server (see FIG. 10). However, in many cases only a portion of these virtual gaming peripherals may be active. For instance, the virtual entertainment center 118, the virtual ATM 116, the virtual lottery 120, the virtual player tracking 112 and the virtual player tracking 114 may all be stored on a memory device on the gaming machine. However, the operating system may only load into RAM and activate one of the virtual player tracking peripherals and the virtual lottery peripheral 120. At a later time, the virtual lottery peripheral may be deactivated by the operating system and the virtual entertainment center 118 and the virtual ATM 116 may be activated by the operating system.

The virtual gaming peripherals may be activated as a function of time according gaming machine use patterns. In times of high demand, the amount of virtual gaming peripherals may be available on the gaming machine may be limited so that players focus primarily on game play. In time of low demand, more virtual gaming peripherals may be available on the gaming machine to attract players to use the gaming machine.

Five shared device managers are shown including: 1) a card reader manager 132 used to arbitrate control of the card reader 24, 2) a display manager 134 used to arbitrate control of the display 34, 3) a printer manager 130 used to arbitrate control of the printer 18, 4) a bill validator manager 136 used to arbitrate control of the bill validator, 5) a key pad manager used to arbitrate control of the key pad 22. Since the virtual gaming peripheral processes active on the gaming machine may change as a function of time the contexts used by the shared device managers 150 and the number of shared device managers may change as a function of time. For example, the bank manager 222 may generate a context for controlling the bill validator. When no other processes use the bill validator other than the bank manager 222, then the bill validator manager 136 may not be required. However, when the virtual ATM peripheral process 116 is active on the gaming machine, the virtual ATM process 116 may generate a context where control of the bill validator is required. Therefore, the bill validator manager process 136 may be required to arbitrate control of the bill validator 30 between contexts generated by the virtual ATM 116 and the bank manager 222.

When a gaming process, including but not limited to processes such as a virtual gaming peripheral processes 110 and game play processes such as the game manager 221 and bank manager 222, are loaded onto the gaming machine for execution, logic residing in the operating may determine what contexts are generated by the gaming process and update the shared gaming device managers. In one embodiment, a context table may be maintained for each gaming device. The context table may be updated by the gaming operating system as gaming processes are activated and deactivated on the gaming machine. The context table may include but is not limited to a list of the contexts for the gaming device, the name of the gaming process that generates the context, a priority for the context and information regarding when the context may be entered and may be exited. The context table may be used by a gaming device manager for each shared gaming device to arbitrate control of the shared gaming device. The present invention is not limited to a context table approach and other logical methods may be used to perform the book keeping associated with dynamic contexts on the gaming machine.

For example, the virtual lottery peripheral may use the printer 18, the display 34, the touch screen 35 and the bill validator 30 to allow a player to purchase a lottery ticket. When the virtual lottery peripheral 120 is loaded by the operating system the gaming operating system may update a table of contexts maintained for each gaming device used by the virtual lottery peripheral 120 including a context table for the printer 18, a context table for the display 34, a context table for the touch screen 35 and a context table for the bill validator 30. The updated context tables for each shared gaming device may be used by the appropriate shared gaming device manager to arbitrate control of the shared gaming devices during operation of the gaming machine.

Figure 5:
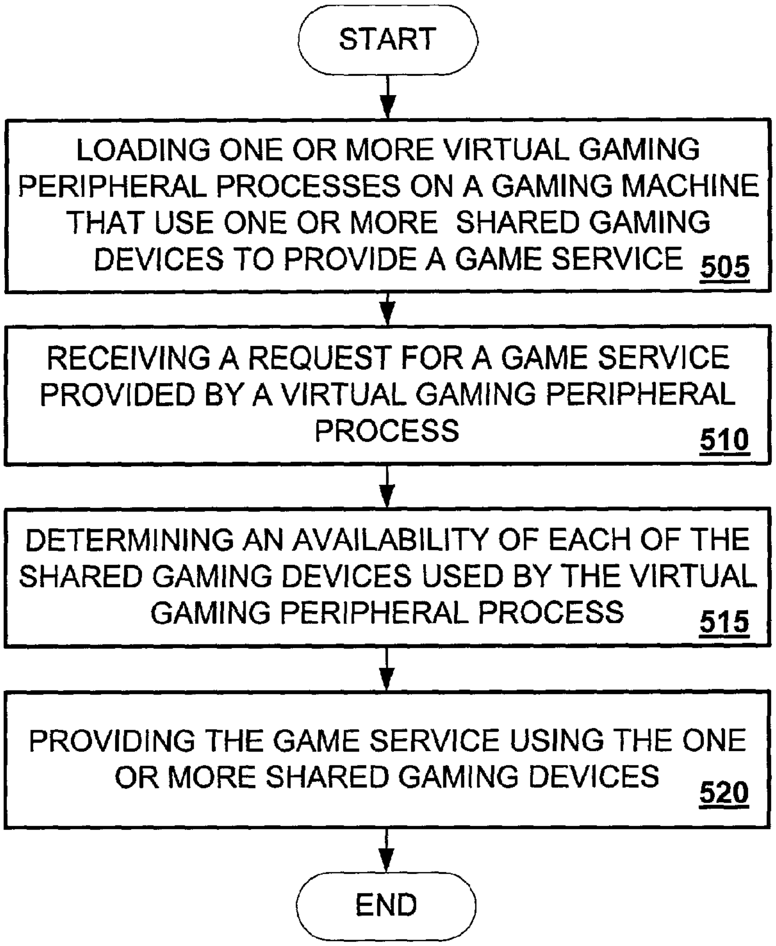
FIG. 5 is a flow chart depicting a method of providing a game service using a virtual gaming peripheral.

FIG. 5 is a flow chart depicting a method of providing a game service using a virtual gaming peripheral on a gaming machine. In 505, the gaming operating system may load one or more virtual gaming peripheral processes. Each virtual gaming peripheral process may use a combination of gaming devices to provide one or more gaming services. The gaming operating system may also load other gaming processes such as gaming processes used to provide a game of chance that may require the use of one or more gaming devices.

When loading or activating a gaming process on the gaming machine, the gaming operating system may determine the contexts in which the gaming process uses various gaming devices. The context information for each gaming device may be stored in a context table describing the contexts for the device. For example, a virtual ATM gaming peripheral process may a card reader, a key pad, a display screen, a printer and a touch screen to provide ATM services. When this process is loaded, the gaming operating system may determine all the contexts in which the virtual ATM process may use the key pad, the display screen, the card reader, the printer and the touch screen and update appropriate context tables for each of these gaming devices.

When a gaming device may be required to support contexts from two or more gaming processes that may conflict, i.e., two or more gaming processes may request control of the same gaming device simultaneously, then the gaming operating system may load a shared device manger to arbitrate control of the gaming device. For instance, a virtual ATM gaming peripheral, a virtual player tracking gaming peripheral and bank manager gaming process in some instances may simultaneously attempt to control the card reader. In this case, a card reader device manager may be used to arbitrate control of the card reader between the processes. The card reader device manager may use a card reader device context table to provide guidelines in regards to granting and switching control of the card reader to different processes.

In 510, a virtual gaming peripheral receives a request for a game service provided by the peripheral. For instance, a virtual entertainment center peripheral may receive a request to display a sporting event on a display screen on the gaming machine. In 515, the availability of each of the gaming devices used by the virtual gaming peripheral are determined. For instance, the virtual entertainment center peripheral may require the use of a display screen on the gaming machine and a communication connection to an outside video feed. Thus, the virtual entertainment center may request control of these devices. When the requested devices are not being used by other gaming processes, control of the display and communication connection may be granted to the virtual entertainment center. The number of outside communication connections available on a gaming machine may be limited. Thus, the outside communication connection may not always be available. In 520, the virtual gaming peripheral may use one or more shared gaming devices to provide the requested service. For instance, the virtual entertainment center may use the display and outside communication connection to present the requested sporting event. The outside communication connection may be an Ethernet communication connection with bandwidth that may be shared.

FIG. 6 is a flow chart depicting a method of arbitrating control of shared gaming devices on a gaming machine. In one embodiment, the logic may be implemented by a shared gaming device manager as described with respect to FIGS. 3 and 4. In 605, a request is received from a virtual gaming peripheral process or a gaming process. In 610, the a priority may be assigned to the request. The priority may depend on the context in which the gaming device is to be used. In some cases, the priority assigned to a request may vary as a function of time. For instant, the priority assigned to a context generated from a particular virtual gaming peripheral may be increased or decreased to allow the gaming service provided by the virtual gaming peripheral to be emphasized or de-emphasized. In some embodiments, the priority information for the contexts in which each gaming device may be used are stored in a context table.

In 610, it is determined whether the requested shared gaming device is not being used. In 615, when the requested gaming device is not being used, the gaming process requesting to use the gaming device may be granted control of the gaming device. In one embodiment, the gaming process may be notified via a gaming event message distributed through the event manager (see FIG. 3). The gaming process context currently controlling the requested gaming device and its priority may be stored on the gaming machine.

In 625, when the requested gaming device is not being used, the priority of the context currently controlling the requested gaming device is compared to the priority of the context requesting control of the gaming device. In 620 and 615, when the priority of the context requesting control of the gaming device is higher, the control of the gaming device may be switched from the current context to the requesting context and the current context may be notified that it no longer controls the gaming device. When the requesting context has a higher priority than current context, the switching of control of the gaming device may not occur automatically. Some contexts may be non-interruptible and thus, may be granted control of the gaming device until their use of the gaming device is completed.

In 630, when the priority of the context requesting control of the gaming device is lower than the current context or the current context is non-interruptible, the gaming process requesting control of the gaming device may be notified that the device is not available. The gaming process that has generated the context may enter an idle state until it is notified that the requested gaming device is available. However, the generated context may be inappropriate and it may be cancelled by the gaming machine. The gaming machine may also generate and store a queue of contexts generated by gaming processes that are waiting to use a particular gaming device.

Figure 7:
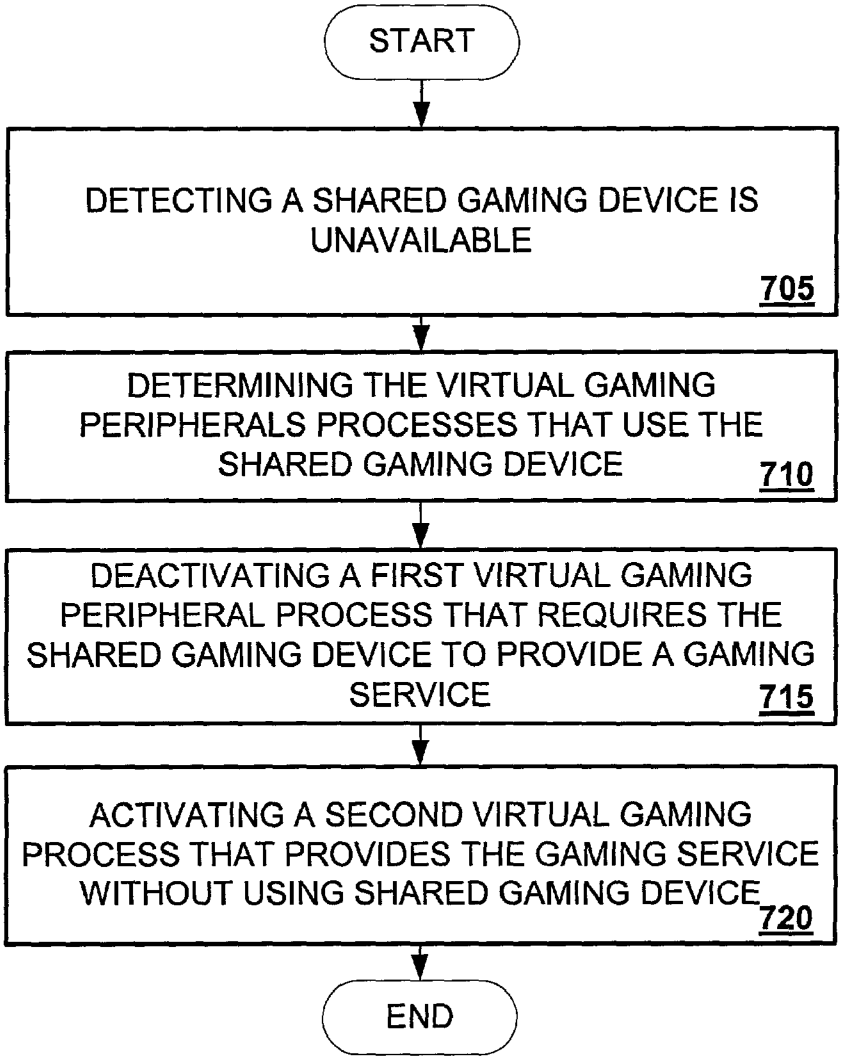
FIG. 7 is a flow chart depicting a method of providing game services using virtual gaming peripherals that can vary according to the gaming devices available on a gaming machine.

FIG. 7 is a flow chart depicting a method of providing a game service using a virtual gaming peripheral that varies according to the gaming devices available on a gaming machine. In 705, in one embodiment, the gaming machine may detect that a gaming device that was available on the gaming machine is no longer available. For instance, the gaming device may require maintenance of some type. In 710, the gaming machine may determine the virtual gaming peripheral processes and gaming processes currently active that generate contexts requiring use of the unavailable gaming device.

After surveying the gaming processes affected by the loss of the gaming device, the gaming machine may develop a recovery plan that allows the gaming machine to function without using the gaming device. The recovery plan may include deactivating gaming processes that require the gaming device and activating gaming processes that provide a level of functionality without using the gaming device. When some desired level of functionality is not possible, the gaming machine may shut itself down. In one embodiment, in 715, a first gaming peripheral process that requires the unavailable gaming device to provide a gaming service is deactivated. The virtual gaming peripheral process may be deleted by the gaming operating system. In 720, a second virtual gaming peripheral process is activated that provides the gaming services without using the gaming device. Thus, the second virtual gaming peripheral provides the same gaming service or a subset of the gaming services provided by the first gaming peripheral using a different combination of gaming devices than the first gaming peripheral i.e., the unavailable gaming device is no longer required.

Figure 8:
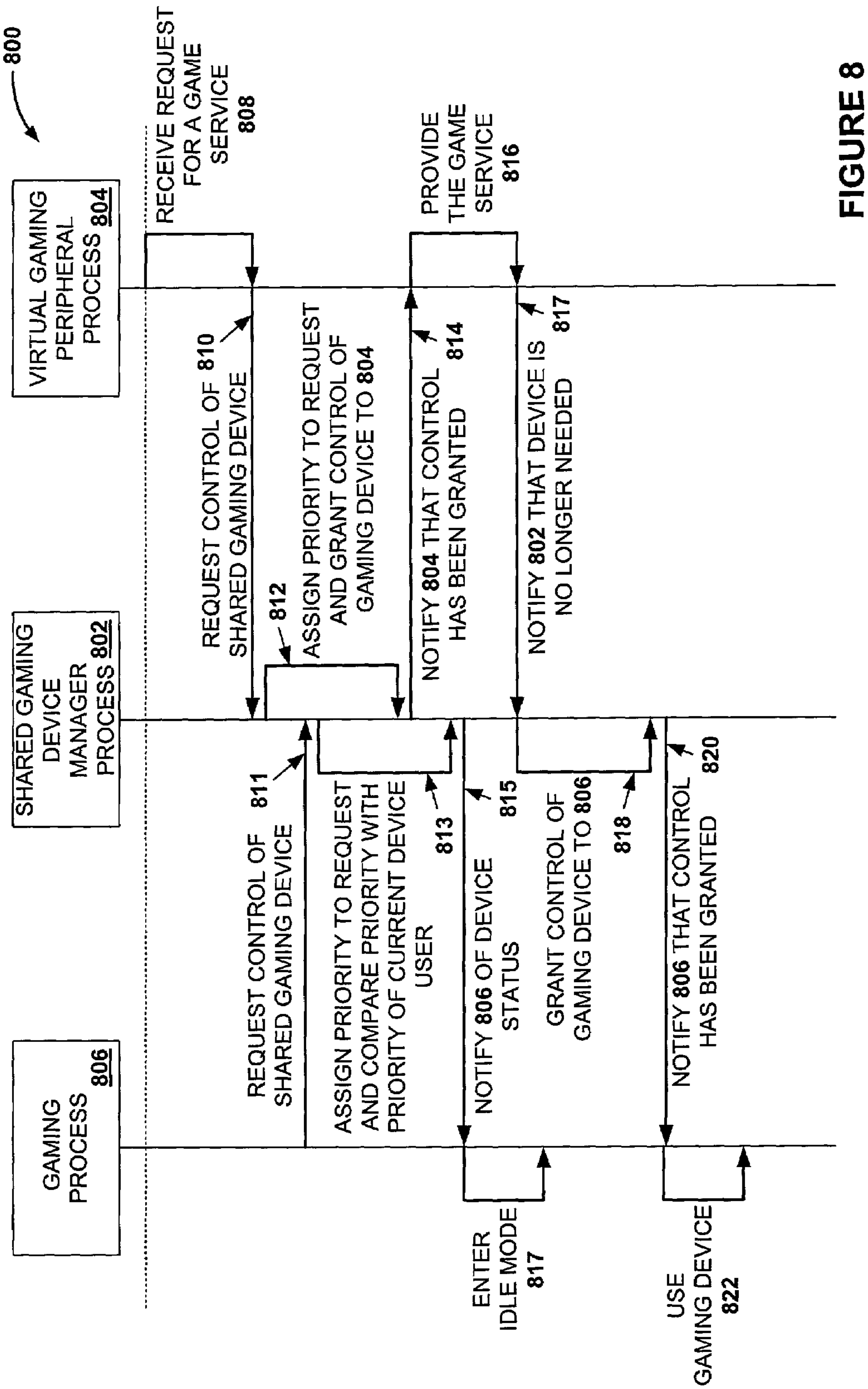
FIG. 8 is an interaction diagram between a virtual gaming peripheral process, a shared gaming device manager process and a virtual gaming peripheral process.

FIG. 8 is an interaction diagram 800 between a virtual gaming peripheral process 804, a shared gaming device manager process 802 and a gaming process 806. The gaming process 806 may be a game play process such a game manager or a bank manager or a virtual gaming peripheral process such as a virtual player tracking peripheral process or a virtual ATM peripheral process. The interaction between the three processes is provided for illustrative purposes only as other more complex interactions are possible with the present invention. For instance, interactions between the shared gaming device manager process 802 and a plurality of gaming process are possible (e.g., 3 or more).

In 808, the virtual gaming peripheral process 804 receives a request for a game service provide by the virtual peripheral. In 810, the virtual gaming peripheral 808 sends a message to the device manager process 802 requesting control of a gaming device arbitrated by the device manager process 802. In 812, the device manager process 802 receives the request, assigns a priority to the request and grants control of the gaming device to the virtual gaming peripheral process 804. In 814, the device manager process sends a message to the virtual gaming process notifying that it now has control of the gaming device.

In 811, the gaming process 806 sends a message to the gaming device manager 802 requesting control of the same gaming device which is now controlled by the virtual gaming peripheral process 804. In 813, the shared gaming device manager 802 assigns a priority to the request by the gaming process 806, compares it to the priority of the request of the virtual gaming peripheral process currently controlling the gaming device and decides the control of the gaming device should remain with the virtual gaming peripheral process 804. In 815, the gaming device manager sends a message to the gaming process 802 indicating that the requested gaming device is unavailable. In 817, after receiving the message from the gaming device manager process 802, the gaming process 806 enters an idle mode. In the idle mode 806, the gaming process is waiting for the requested gaming device to become available.

In 816, the virtual gaming peripheral process provides the requested gaming service using a combination of gaming devices that it controls. In 817, the virtual gaming peripheral process 804 notifies the device manager process 802 that it has finished using the gaming device. In 818, the gaming device manager grants control of the shared gaming device to the gaming process 806. In 820, the device manager process 802 sends a message to the gaming process 806 to notify the gaming process 806 that it now controls the shared gaming device. In 822, the gaming process 806 uses the shared gaming device to provide a gaming function.

FIG. 9 is a block diagram of a gaming machine 2 of the present invention. Components that appear in the previous figures are identified by common reference numerals. A master gaming controller 224 controls the operation of the various gaming devices and the game presentation on the gaming machine 2. The master gaming controller 224 may communicate with other remote gaming devices such as remote servers via a main communication board 215 and network connection 214. The master gaming controller 224 may also communicate other gaming devices via a wireless communication link (not shown). The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF. The gaming machine may include wireless communication ports and wired communication ports such as an infrared port, an Ethernet port and a USB port.

Using a game code and graphic libraries stored on the gaming machine 2, the master gaming controller 224 generates a game presentation which is presented on the displays 34 and 42. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 236 located on the master gaming controller 224 or alternatively on the video controller 237. The gaming machine 2 may also include a video card (not shown) with a separate memory and processor for performing graphic functions on the gaming machine. Typically, the video memory 236 includes 1 or more frame buffers that store frame data that is sent by the video controller 237 to the display 34 or the display 42. The frame buffer is in video memory directly addressable by the video controller. The video memory and video controller may be incorporated into a video card which is connected to the processor board containing the master gaming controller 224. The frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 224, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 237 to one or more of the displays. For instance, a frame corresponding to a movie stored on the game partition 223 of the hard drive 226, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2.

For gaming machines, an important function is the ability to store and re-display historical game play information. The game history provided by the game history information assists in settling disputes concerning the results of game play. A dispute may occur, for instance, when a player believes an award for a game outcome has not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage 234 on the gaming machine and displayed in some manner to a display on the gaming machine. In some embodiments, game history information may also be stored to a history database partition 221 on the hard drive 226. The hard drive 226 is only one example of a mass storage device that may used with the present invention. For instance, CD/DVD drive, a removable media drive and a flash drive may be used. The game history information is used to reconcile the dispute.

During the game presentation, the master gaming controller 224 may select and capture certain frames to provide a game history. These decisions are made in accordance with particular game code executed by controller 224. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller 224.

Various gaming software modules used to play different types of games of chance may be stored on the hard drive 226. Each game may be stored in its own directory to facilitate installing new games and virtual gaming peripherals (and removing older ones) in the field. To install a new game or a new virtual gaming peripheral, a utility may be used to create the directory and copy the necessary files to the hard drive 226. To remove a game or a virtual gaming peripheral, a utility may be used remove the directory that contains the game and its files.

On boot up, a gaming process in the game OS can iterate through the game directories on the hard drive 226 and detect the games and virtual gaming peripherals present on the gaming machine. The gaming process may obtain all of its necessary information to decide on which games can be played, how to allow the user to select one (multi-game) and which virtual gaming peripheral processes are to be installed on the gaming machine. The game manager may verify that there is a one to one relationship between the directories on the NV-memory 234 and the directories on the hard drive 226. Details of the directory structures on the NV-memory and the hard drive 226 and the verification process are described in co-pending U.S. application Ser. No. 09/925,098, filed on Aug. 8, 2001, by Cockerille, et al., titled "Process Verification," which is incorporated herein in its entirety and for all purposes.

FIG. 10 is a block diagrams of gaming machines that utilize distributed gaming software and distributed processors to generate a game of chance for one embodiment of the present invention. A master gaming controller 224 is used to present one or more games on the gaming machines 61, 62 and 63. The master gaming controller 224 executes a number of gaming software modules, including but not limited to virtual gaming peripheral processes, to operate gaming devices 70, such as coin hoppers, bill validators, coin acceptors, speakers, printers, lights, displays (e.g. 34) and other input/output mechanisms. The master gaming controller 224 may also execute gaming software enabling communications with gaming devices located outside of the gaming machines 61, 62 and 63, such as player tracking servers, bonus game servers, game servers and progressive game servers. These outside communications may be used by some virtual gaming peripherals such as virtual player tracking peripheral. In some embodiments, communications with devices located outside of the gaming machines may be performed using the main communication board 215 and network connections 71. The network connections 71 may allow communications with remote gaming devices via a local area network, an intranet, the Internet or combinations thereof.

The gaming machines 61, 62 and 63 may use gaming software modules to generate a game of chance that may be distributed between local file storage devices and remote file storage devices. For example, to play a game of chance on gaming machine 61, the master gaming controller may load gaming software modules into RAM 56 that may be may be located in 1) a file storage device 226 on gaming machine 61, 2) a remote file storage device 81, 2) a remote file storage device 82, 3) a game server 90, 4) a file storage device 226 on gaming machine 62, 5) a file storage device 226 on gaming machine 63, or 6) combinations thereof. Virtual gaming peripheral software may also be distributed in a similar manner.

In one embodiment of the present invention, the gaming operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on-chip, removable media (e.g. ZIP drives with ZIP disks, floppies or combinations thereof. For both security and regulatory purposes, gaming software executed on the gaming machines 61, 62 and 63 by the master gaming controllers 224 may be regularly verified by comparing software stored in RAM 56 for execution on the gaming machines with certified copies of the software stored on the gaming machine (e.g. files may be stored on file storage device 226), accessible to the gaming machine via a remote communication connection (e.g., 81, 82 and 90) or combinations thereof.

The game server 90 may be a repository for game software modules and software for other game services (e.g., virtual gaming peripheral processes) provided on the gaming machines 61, 62 and 63. In one embodiment of the present invention, the gaming machines 61, 62 and 63 may download game software modules from the game server 90 to a local file storage device to play a game of chance or the download may be initiated by the game server. For instance, when a gaming device used by a virtual gaming peripheral to provide a game service fails on the gaming machine, in some cases, the gaming machine may be able to download a new virtual gaming peripheral from the game server 90 that provides the game service without using the failed gaming device. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes. In another example, the game server might also be a dedicated computer or a service running on a server with other application programs.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A gaming machine comprising:

a housing;

a plurality of gaming devices coupled to the housing including a shared gaming device;

an input mechanism coupled to the housing configured for inputting cash or indicia of credit used for wagers on a game of chance played on the gaming machine;

a master gaming controller designed to generate the game of chance played on the gaming machine and to execute simultaneously a first virtual gaming peripheral process, a second virtual gaming peripheral process, a shared gaming device manager process and logic for managing and distributing game events wherein the logic for managing and distributing game events is designed to receive the game events and to distribute the game events to at least the first virtual gaming peripheral process, the second virtual gaming peripheral process and the shared gaming device manager process;

the first virtual gaming peripheral process designed to provide a first gaming service by controlling a first combination of the plurality of gaming devices, including a shared gaming device, to provide the first gaming service wherein the first virtual gaming peripheral process is operable to take control of the shared gaming device in response to receiving a first game event;

the second virtual gaming peripheral process designed to provide a second gaming service by controlling a second combination of the plurality of gaming devices, including the shared gaming device, to provide the second gaming service wherein the second virtual gaming peripheral process is operable to take control of the shared gaming device in response to receiving a second game event;

the shared gaming device adapted for control by the first virtual gaming peripheral process or the second virtual gaming peripheral process; and a shared gaming device manager process designed to determine when the first virtual gaming peripheral process and the second virtual gaming peripheral process want to control the at least one shared gaming device at the same time, which of the first virtual gaming peripheral process or the second virtual gaming peripheral process is allowed to control the shared gaming device and which of the first virtual gaming peripheral process or the second virtual gaming peripheral process is prevented from using the shared gaming device.

2. The gaming machine of claim 1, wherein the shared gaming device is selected from the group consisting of a light panel, a bonus wheel, a sound projection device, a card reader, a ticket reader, an input panel, a ticket reader, a touch screen, a display screen, a key pad, a camera, a finger print reader, a bill validator, a solenoid, a CD/DVD-drive, a removable media drive, a flash drive, a USS communication port, an infrared communication port, an Ethernet communication port, a printer, a bar-code reader, a biometric input device, a slot reel, a motor, a mass storage device, a communication device, a wireless communication interface, a coin hopper and a coin acceptor.

3. The gaming machine of claim 1, wherein the plurality of gaming devices are selected from the group consisting of a light panel, a bonus wheel, a sound projection device, a card reader, a ticket reader, an input panel, a ticket reader, a touch screen, a display screen, a key pad, a camera, a finger print reader, a bill validator, a solenoid, a CD/DVD-drive, a removable media drive, a flash drive, a USB communication port, an infrared communication port, an Ethernet communication port, a printer, a bar-code reader, a biometric input device, a slot reel, a motor, a mass storage device, a communication device, a coin hopper, a note dispenser and a coin acceptor.

4. The gaming machine of claim 1, wherein the gaming service is selected from the group consisting of a player tracking service, a vending machine purchase, a lottery ticket purchase, an ATM (Automatic Teller Machine) service, a hotel/casino service, a communication service, a registration service, a sports book service, an entertainment service, a prize redemption service, Internet enabled services, and a locator service.

5. The gaming machine of claim 1, wherein the first virtual gaming peripheral process or the second virtual gaming peripheral process is selected from the group consisting of a virtual player tracking unit process, a virtual vending machine process, a virtual lottery machine process, a virtual ATM process, a virtual concierge process, a virtual video phone process, a virtual telephone process, a virtual casino kiosk process, a virtual prize redemption process, a virtual sports book process, a virtual entertainment center process and a virtual message center process.

6. The gaming machine of claim 1, wherein a first virtual gaming peripheral process provides the gaming service using a first set of gaming devices and wherein a second virtual gaming peripheral process provides the same gaming service using a second set of gaming devices.

7. The gaming machine of claim 1, wherein the first virtual gaming peripheral process or the second virtual gaming peripheral process is a virtual player tracking unit process that uses at least a card reader, a display screen and a key pad to provide a player tracking service.

8. The gaming machine of claim 1, wherein the first virtual gaming peripheral process or the second virtual gaming peripheral process is a virtual player trucking unit process that uses at least a card reader, a display screen and a touch screen to provide a player tracking service.

9. The gaming machine of claim 1, wherein the first virtual gaming peripheral process or the second virtual gaming peripheral process is a virtual ATM process that uses at least a key pad, a card reader, a display screen and a touch screen to provide ATM services.

10. The gaming machine of claim 1, wherein the first virtual gaming peripheral process or the second virtual gaming peripheral process is a virtual lottery machine process that uses at least a touch screen, a display screen and a ticket printer to provide a lottery ticket purchase.

11. The gaming machine of claim 1, wherein the first virtual gaming peripheral process or the second virtual gaming peripheral process is a virtual sports book process that uses at least a touch screen, a display screen and a ticket printer to provide a sports book wager.

12. The gaming machine of claim 1, wherein the first virtual gaming peripheral process or the second virtual gaming peripheral process is a virtual communication center that uses at least a touch screen and a display screen to provide communication services, messaging services, Internet enabled services and locator services.

13. The gaming machine of claim 1, wherein the game of chance is selected from the group consisting of a slot game, a keno game, a poker game, a pachinko game, a video black jack game, a bingo game, a baccarat game, a roulette game, a dice game and a card game.

14. The gaming machine of claim 1, further comprising:

one or more logic devices wherein each logic device includes a logic device operating system that is used to activate and deactivate one or more of the gaming processes.

15. The gaming machine of claim 1, wherein the first game event and the second game event are the same game event.

* * * * *